(12) United States Patent
Cwilich et al.

(10) Patent No.: US 6,498,778 B1
(45) Date of Patent: Dec. 24, 2002

(54) OPTIMIZING RESTORATION CAPACITY

(75) Inventors: Sebastian Cwilich, Brooklyn, NY (US); Mei Deng, Holmdel, NJ (US); David James Houck, Jr., Colts Neck, NJ (US); David Frederick Lynch, Freehold, NJ (US); James Anthony Schmitt, Little Silver, NJ (US); Luiz Antonio Vitoria, Martinsville, NJ (US); Ken Ambs, Pennington, NJ (US); Dicky Chi Kwong Yan, Clinton, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/215,433

(22) Filed: Dec. 17, 1998

(51) Int. Cl.[7] .............................................. B01R 31/08
(52) U.S. Cl. ....................... 370/216; 370/238; 709/239; 709/241
(58) Field of Search ................................ 370/400, 401, 370/409, 465, 466, 467, 230, 230.1, 231, 235, 238, 338.1, 217, 218, 228; 709/238, 241, 239

(56) References Cited

U.S. PATENT DOCUMENTS

| | | | |
|---|---|---|---|
| 5,058,105 A | | 10/1991 | Mansour et al. |
| 5,059,105 A | * | 10/1991 | Mansour et al. ............... 370/16 |
| 5,182,744 A | | 1/1993 | Askew et al. |
| 5,850,505 A | * | 12/1998 | Grover et al. ......... 395/182.02 |
| 6,141,318 A | * | 11/2000 | Miyan ......................... 370/217 |
| 6,141,319 A | * | 11/2000 | Dighe et al. ................. 370/218 |
| 6,304,349 B1 | * | 11/2001 | Alanyali et al. ............ 359/127 |

OTHER PUBLICATIONS

H. Sakauchi, Y. Nishimura & S. Hasegawa, *A Self–Healing Network With An Economical Spare–Channel Assignment*, IEEE Globecom '90, CH2827–4/90/000, pp. 438–443 (1990).

W.D. Grover, T.D. Bilodeau & B.D. Venables, *Near Optimal Spare Capacity Planning In A Mesh Restorable Network*, IEEE Globecom '91, CH2980–1/91/0000, pp. 2007–2012 (1991).

M. Herzberg, *A Decomposition Approach to Assign Spare Channels in Self–Healing Networks*, IEEE Globecom '93, 0–7803–0917–0/93, pp. 1601–1605 (1993).

C. Wynants, M. Gendreau, M. Labbe & R. Seguin, *Optimizing Reserve Capacities of Partially Equipped SDH Networks* (Sep. 1996).

T. Magnanti & Y. Wang, *Polyhedral Properties of the Network Restoration Problem—with the Convex Hull of a Special Case*, Working paper OR 323–97, Operations Research Center, MIT (Nov. 1997).

* cited by examiner

Primary Examiner—Alpus H. Hsu
Assistant Examiner—Thien D. Tran
(74) Attorney, Agent, or Firm—Morgan & Finnegan, LLP

(57) ABSTRACT

A method and system are provided for computing an optimal restoration capacity and/or optimal restoration paths for a network to resolve a restoration scenario by solving a linear program (LP) model. The LP model includes decision variables corresponding to restoration capacity and restoration paths and constraints requiring restoration of traffic and conservation of capacity in the network. For example, the system determines a set of network paths that need to be restored in the network, preprocesses network data corresponding to the network to reduce LP processing workload and time; generates possible restoration paths and solves the LP model, preferably through column generation methods, to determine the optimal restoration capacity and/or the optimal restoration paths to resolve the restoration scenario; changes the LP solution into integer form, as necessary, and changes the LP solution in integer form to the original format of the network data or an equivalent thereof.

33 Claims, 17 Drawing Sheets

*FIG. 3A*

| NODE | FASTAR CAPABLE NODE | TERMINATION-LIMITED NODE |
|---|---|---|
| A | YES | NO |
| B | NO | NO |
| C | YES | NO |
| D | YES | NO |
| E | NO | NO |
| F | YES | NO |
| G | NO | NO |
| H | YES | NO |
| I | YES | YES |

FIG. 3B

| SPANS | TERMINATION NODE | TERMINATION NODE | SPAN LENGTH (MILES) | AFFECTED RINs FOR SPAN FAILURE |
|---|---|---|---|---|
| s1 | A | B | 10.0 | R1, R9 |
| s2 | A | C | 10.0 | R2 |
| s3 | B | D | 10.0 | R1, R10 |
| s4 | C | D | 1.5 | R8 |
| s5 | C | E | 10.0 | R2 |
| s6 | C | F | 10.0 | - |
| s7 | D | E | 10.0 | R3 |
| s8 | D | F | 10.0 | R5 |
| s9 | E | F | 10.0 | R7 |
| s10 | E | G | 10.0 | R4 |
| s11 | F | G | 10.0 | R5 |
| s12 | G | H | 10.0 | R6 |
| s13 | H | I | 10.0 | R11 |

FIG. 3C

| ROUTE IDENTIFICATION NUMBER (RIN) | TERMINATION NODE | TERMINATION NODE | SPANS | CAPACITY |
|---|---|---|---|---|
| R1 | A | D | s1, s3 | 5 |
| R2 | A | E | s2, s5 | 10 |
| R3 | D | E | s7 | 15 |
| R4 | E | G | s10 | 20 |
| R5 | D | G | s8, s11 | 25 |
| R6 | G | H | s12 | 30 |
| R7 | E | F | s9 | 35 |
| R8 | C | D | s4 | 40 |
| R9 | A | B | s1 | 40 |
| R10 | B | D | s3 | 40 |
| R11 | H | I | s13 | 40 |

FIG. 3D

| T3 | OPERATING NODE | TERMINATION NODE | SERVICE PATH | QUANTITY OF T3s |
|---|---|---|---|---|
| $T3_1$ | A | G | R2, R4 | 10 |
| $T3_2$ | A | E | R1, R3 | 10 |
| $T3_3$ | A | G | R1, R3, R4 | 10 |
| $T3_4$ | E | H | R4, R6 | 10 |
| $T3_5$ | E | I | R2, R9, R10, R5, R6, R11 | 10 |

OPTIMIZING RESTORATION CAPACITY

TECHNICAL FIELD

The invention relates generally to optimizing network restoration and, more particularly, to optimizing restoration capacity and/or restoration paths for a network to resolve a restoration scenario or problem through the use of linear programming.

BACKGROUND

Interruptions in network operations are typically caused by failures in the network, such as an inoperable communication path (e.g., a link) or switching office. These failures may result from a variety of events, such as street works, thunder storms, equipment failures, floods, and so forth. A failure in the network can create a severe service loss to customers and revenue loss to the telecommunication service provider. Accordingly, the problem of network restoration and reliability is a major concern to the telecommunication industry.

The network restoration problem may be separated into two parts, i.e., spare capacity design and online restoration. First, spare capacity design is a special network design problem in which minimal spare capacity must be installed in a network to restore disrupted services in the event of any failure. The objective of such a network restoration design problem, also known as the spare capacity assignment problem, is to determine where and how much spare capacity to install in a network while minimizing facility cost. Second, online restoration is implemented at the time of failure to establish an alternate route around an inoperable link or switching office. Restoration paths for affected demands can be computed in real time by an online restoration algorithm. Two restoration schemes have been considered: line restoration and path restoration. In line restoration, when a link fails, an affected demand on the link is redirected to an alternative route that connects the two ends of the failed link. In path restoration, an affected path is restored from the source to the destination.

Accordingly, there is a need to improve overall reliability of networks. There is also a need for a method and system to improve the planning of restoration capacity in a network or, in other words, to find a better way to design and utilize restoration capacity in the network.

SUMMARY OF THE INVENTION

The above-identified problems are solved and a technical advance is achieved in the art by providing a method and system for computing an optimal restoration capacity and/or optimal restoration path for a network to resolve a restoration scenario or problem ("hereinafter restoration scenario") by solving a linear program (LP) model, wherein the linear program model includes decision variables corresponding to restoration capacity and restoration paths and constraints requiring restoration of traffic and conservation of capacity in the network. The method and system of the invention is able to solve restoration scenarios, including line restoration problems and path restoration problems, in a manner which optimizes the use and integration of capacity in the network for restoring network traffic. As compared to other optimization methods, such as the node-arc formulation in linear programming, the path-based formulation of the invention requires fewer constraints and, thus, provides a simpler approach to solving restoration scenarios.

In one embodiment, the method and system of the invention determines a set of network paths (e.g., demands, links, etc.) that need to be restored preferably to meet direct measures of quality (DMOQ) for a restoration scenario, preprocesses network data corresponding to the network to be optimized to reduce LP processing workload and time (e.g., by aggregating network data); generates all possible restoration paths for the given restoration scenario; solves the LP model to obtain the optimal restoration capacity and/or the optimal restoration paths for the restoration scenario; changes the LP solution into integer form (as necessary), and changes the integer LP solution to the original format of the network data or an equivalent thereof.

In another embodiment, the method and system of the invention employs column generation methods in combination with linear programming to determine the optimal restoration capacity and/or the optimal restoration paths to resolve a restoration scenario. Initially, a set of network paths (e.g., demands, links, etc.) that need to be restored to meet DMOQ are determined for the restoration scenario, and the network data corresponding to the network to be optimized is preferably preprocessed to reduce LP processing workload and time (e.g., by aggregating network data). In accordance with column generation methods, one possible restoration path is generated for each affected network path initially. The LP model is then solved with all of the restoration capacity variables and the restoration path variables generated so far. After solving the LP model with the initial generated possible restoration paths, the dual LP solution is used to find a shortest restoration path for each demand. If the total length of a shortest restoration path of a network path is less than the length of dual variable corresponding to the restoration path variable of the network path, the restoration path is a feasible restoration path and is added to the set of restoration paths for the demand. The revised set of possible restoration paths are then used to solve the LP model. These steps are repeated until no feasible restoration paths can be found for any network path or, in other words, the optimal LP solution is reached. Thereafter, the LP solution is changed into integer form (as necessary) and then changed back to the original format of the network data or equivalent thereof. With column generation, restoration paths are only generated as needed to find the optimal solution to the LP model. Such an arrangement substantially reduces the number of possible restoration paths that need to be generated to solve the LP model and, thus, reduces the overall LP processing workload and time.

For column generation, the invention further provides a dynamic path control policy to increase the convergence speed of the LP solution. The dynamic path control policy regulates the number of restoration paths retained for use in each LP iteration by defining the maximum number or range of restoration paths to be retained in solving the LP model.

Other and further aspects of the present invention will become apparent during the course of the following description and by reference to the attached drawings.

BRIEF DESCRIPTION OF THE DRAWINGS

FIG. 3A is an example of a node table of the network data.

FIG. 3B is an example of a span table of the network data.

FIG. 3C is an example of a Route Identification Number (RIN) table of the network data.

FIG. 3D is an example of a demand table of the network data.

DETAILED DESCRIPTION

Figure 2:
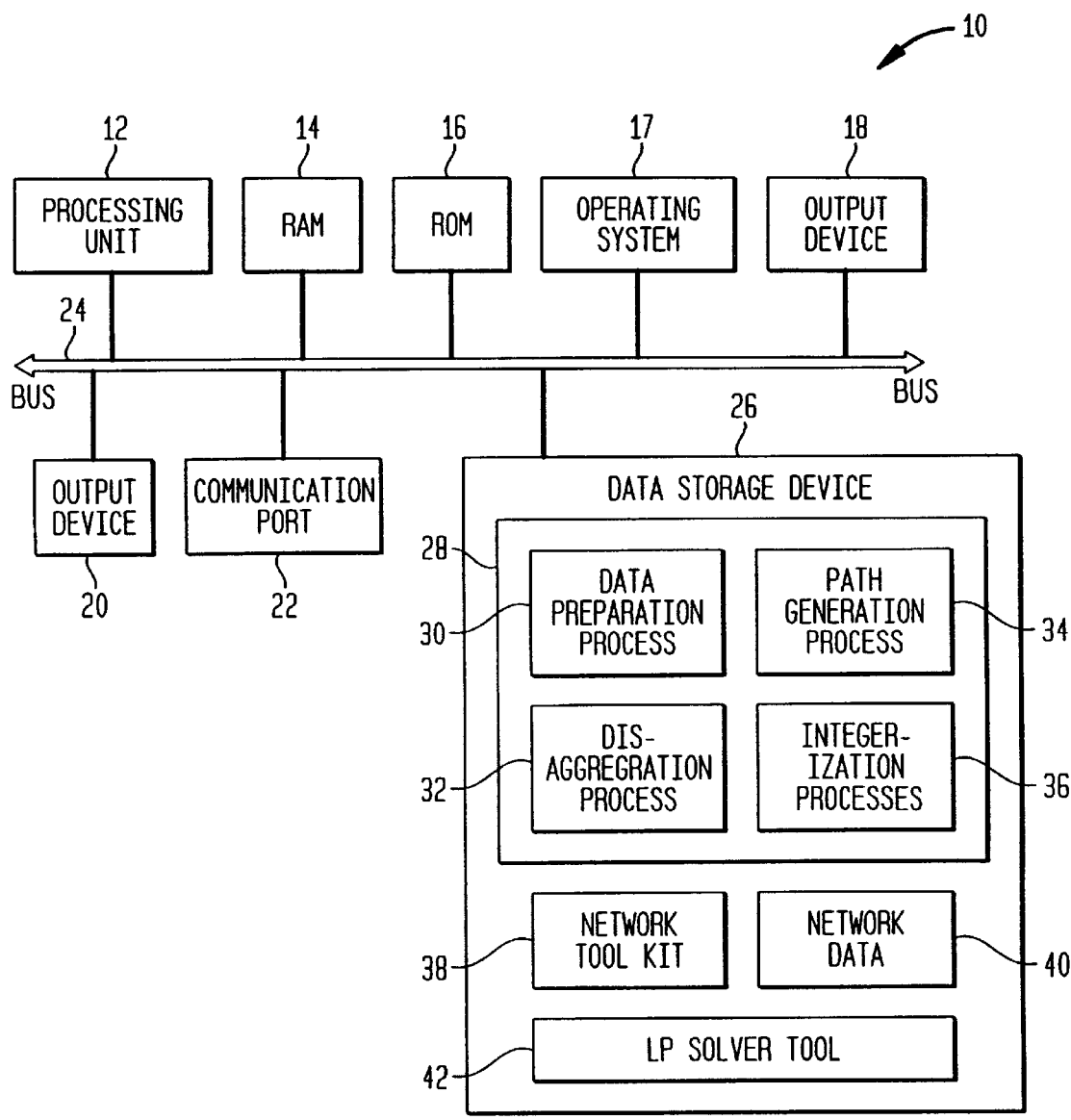
FIG. 2 is a schematic block diagram illustrating a system configured to utilize a path-based method to compute an optimal restoration capacity and/or optimal restoration paths for a network to resolve a restoration scenario or problem through the use of linear programming (LP) in accordance with a first embodiment of the invention.
Figure 14:
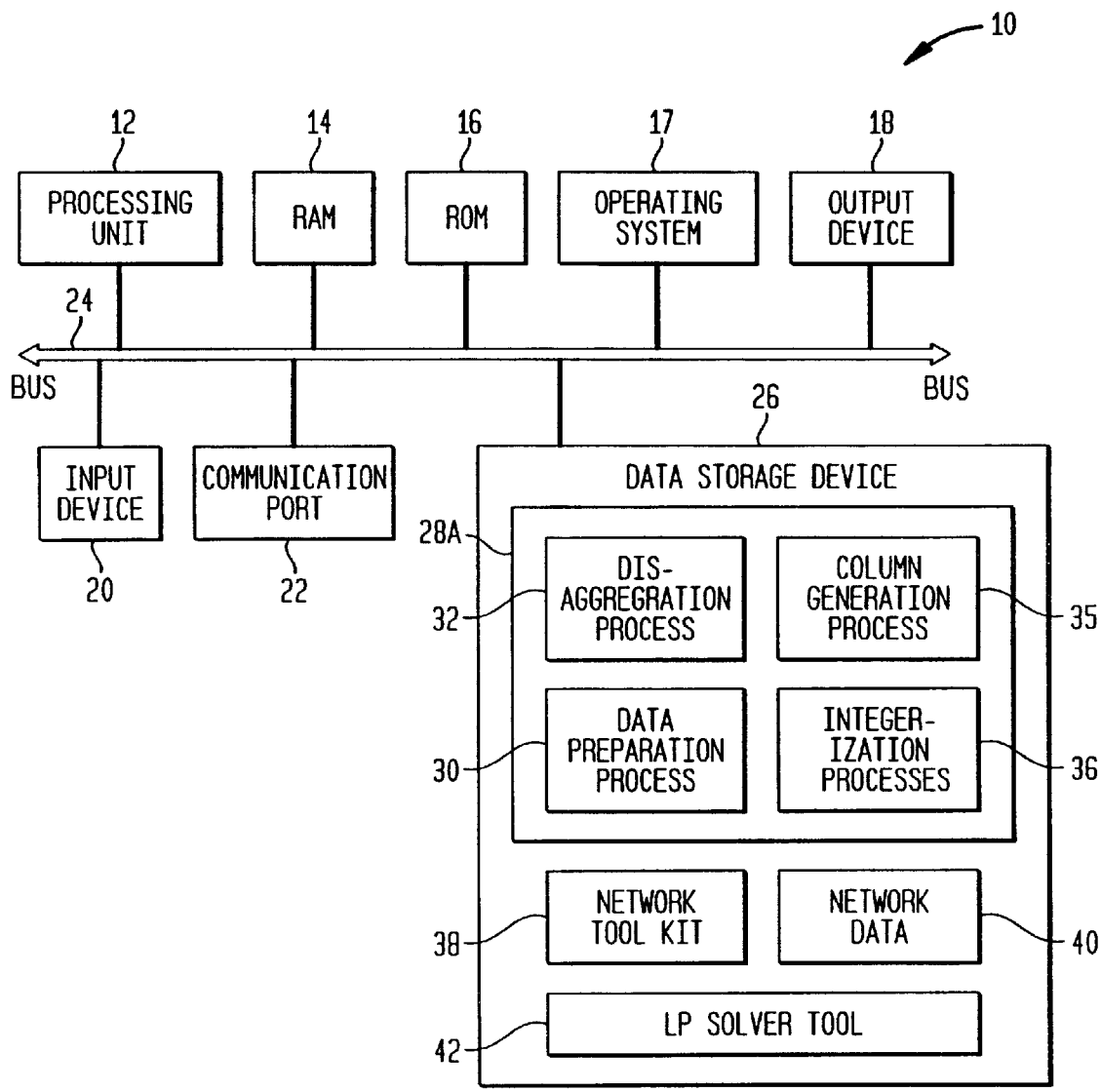
FIG. 14 is a schematic block diagram illustrating a system configured to utilize a path-based methodology to compute an optimal restoration capacity and/or optimal restoration paths for a network to resolve a restoration scenario or problem through the use of a linear programming and column generation methods in accordance with a second embodiment of the invention.

Referring now to the drawings wherein like reference numbers refer to like parts, FIGS. 2 and 14 illustrate exemplary examples of a computerized system 10 configured to compute an optimal restoration capacity and/or optimal restoration paths for a network to resolve a restoration scenario, in accordance with a first embodiment and second embodiment, respectively. That is, computerized system 10 solves a linear program (LP) model formulated to resolve the restoration scenario, wherein the LP model including decision variables corresponding to restoration capacity and restoration paths and constraints requiring restoration of traffic and conservation of capacity in the network. The method and system of the invention is able to solve restoration scenarios, including line restoration problems and path restoration problems, in a manner which optimizes the use and integration of capacity in the network for restoring network traffic. As compared to other optimization methods, such as the node-arc formulation in linear programming, the path-based formulation of the invention requires fewer constraints and, thus, provides a simpler approach to solving network restoration problems.

In the first embodiment of the invention, computerized system 10 preferably determines a set of network paths (e.g., demands, links, etc.) that need to be restored to meet direct measures of quality (DMOQ) in the network, preprocesses network data corresponding to the network to be optimized to reduce LP processing workload and time; generates all possible restoration paths for the given restoration scenario; solves the LP model to obtain the optimal restoration capacity and/or the optimal restoration paths for the restoration scenario; changes the LP solution into integer form (as necessary), and changes the integer LP solution to the original format of the network data or an equivalent thereof.

In the second embodiment of the invention, computerized system 10 is configured to employ column generation methods in combination with linear programming to determine the optimal restoration capacity and/or the optimal restoration paths for a network to resolve a restoration scenario. In general, computerized system 10 determines a set of network paths (e.g., demands, links, etc.) that need to be restored to meet DMOQ for the network scenario and preprocesses network data corresponding to the network to be optimized to reduce LP processing workload. According to the column generation technique, computerized system 10 then generates one possible restoration path for each affected network path initially. Computerized system 10 then solves the LP model with all of the restoration capacity variables and the restoration path variables generated so far. After solving the LP model with the initial generated possible restoration paths, the dual LP solution is used to find a shortest restoration path for each network path. If the total length of a shortest restoration path of a network path is less than the dual variable corresponding to the restoration path variable of the network path, the restoration path is a feasible path and is added to the set of restoration paths for the network path. The revised set of possible restoration paths are then used to solve the LP model. These steps are repeated until no feasible restoration path can be found for any network path. Thereafter, computerized system 10 then changes the LP solution into integer form (as necessary) and changes the integer LP solution back to the original format of the network data or equivalent thereof With column generation, restoration paths are only generated as needed to find the optimal solution to the LP model. Such an arrangement substantially reduces the number of possible restoration paths that need to be generated to solve the LP model and, thus, reduces the overall LP processing workload and time.

Prior to discussing the invention in further detail, it is well to define certain terms to be used herein.

The terms path, network path and restoration path refer generally to a communication medium between two nodes or endpoints in a network, such as a link, a demand, etc.

The term restoration capacity refers generally to any type of capacity that may be used to restore traffic in a network in the event of some network failure. For example, restoration capacity may refer to new builds (also referred to as regular augments), capacity already embedded in the network (also referred to as embedded capacity), uncabled capacity (also referred to as cheap capacity or cheap augments) or other capacity pre-designated for a particular purpose. The pre-designated capacities may include, for example, those which are designated for restoration only, those which are activated for individual services, etc.

The term direct measure of quality (DMOQ) refers to a level of quality or a quality standard to be met by a network. DMOQs may be established for different traffic types in the network. For switched (voice) traffic, the DMOQ is defined, for example, to be the total lost calls during a failure event. For non-switched services, the metric becomes minutes of downtime. Since the non-switched services have higher restoration priorities than voice or data, the lost call constraints usually dominate and will be described here.

For the purposes of discussing the invention, it is well to provide an illustrative example of a network to be optimized, such as an AT&T network with FASTAR® capability. For example, an AT&T network may include a plurality of nodes, each of which has a Digital Cross-Connect System (DCS), such as a Digital Access and Cross-Connect System (DACS) III commercially available from Lucent Technology. The nodes are connected across links, for example, optical fiber cables with each fiber providing a number of DS3 circuits (channels). Within the network, respective endpoints of a link terminate at an associated node in which the termination circuitry may include Line Termination Equipment (LTE) designed to interface optical fibers with a DCS. In this way, a DCS cross-connects signals that are transported via optical fibers (or other broad band digital transport systems) that are in service, and thereby determines the routing of such signals. That is, a signal received via one link may then be electronically cross-connected (i.e., routed) to one of a number of other links also connecting via an LTE to the DCS, in which the cross-connection is based on the destination of the signal, and in which the destination may be the associated node itself or one of the other network nodes. Such LTEs may be, for example, the FT series G line terminating equipment available from Lucent or a SONET ADM.

The AT&T network may include restoration capacity on alternate loops which may be used to restore affected paths. Such capacity may include, for example, Restoration T3s (T3Rs), e.g., capacity designated for network restoration, and Protection T3s (T3Ps), e.g., capacity typically activated for individual service. In the AT&T network, the T3Ps may be cabled or uncabled to a DCS.

FASTAR is a telecommunication network restoration architecture, developed by AT&T, which enhances the reliability of the AT&T network by rerouting disrupted traffic via an alternate route established "on the fly"The FASTAR system monitors (via a polling process) each node and link forming the network through the use of an alarm processor associated with the LTE equipment at DACS III nodes. In the event that such monitoring detects a faulty link or node, a central controller is notified. The controller is arranged to locate spare capacity and establish an alternate route, in which the continuity of the alternate route is confirmed before the disrupted traffic is transferred thereto. A more detailed discussion of the FASTAR system is described in U.S. Pat. No. 5,182,744 to Askew et al. and is hereby incorporated by reference.

For online restoration, the FASTAR system may employ a centralized operations system (OS), such as AT&T's RAPID®, to coordinate the online rerouting of an affected network path. The RAPID system determines an alternate route for the affected path through the use of a shortest-route algorithm and communicates with network nodes to reroute the affected path through the alternate route. For example, the RAPID system receives an alarm indicating a failure in the network, determines the identity of the failure-end offices; determines in real time the least number of links and associated (intermediate) nodes that may be used to establish a possible loop whose end points terminate at the failure-end office; determines the identity of each transfer-end node; and determines the identities of the intermediate nodes that would be used to establish the loop. For each affected path, the RAPID system determines a new alternate path formed from spare capacity defining the shortest loop between the transfer-end nodes. The RAPID system then transmits commands to appropriate DACS III to reroute traffic through the new alternate paths. The RAPID method and system is described in U.S. Pat. No. 5,058,105 to Mansour et al. and is incorporated herein by reference.

Figure 1:
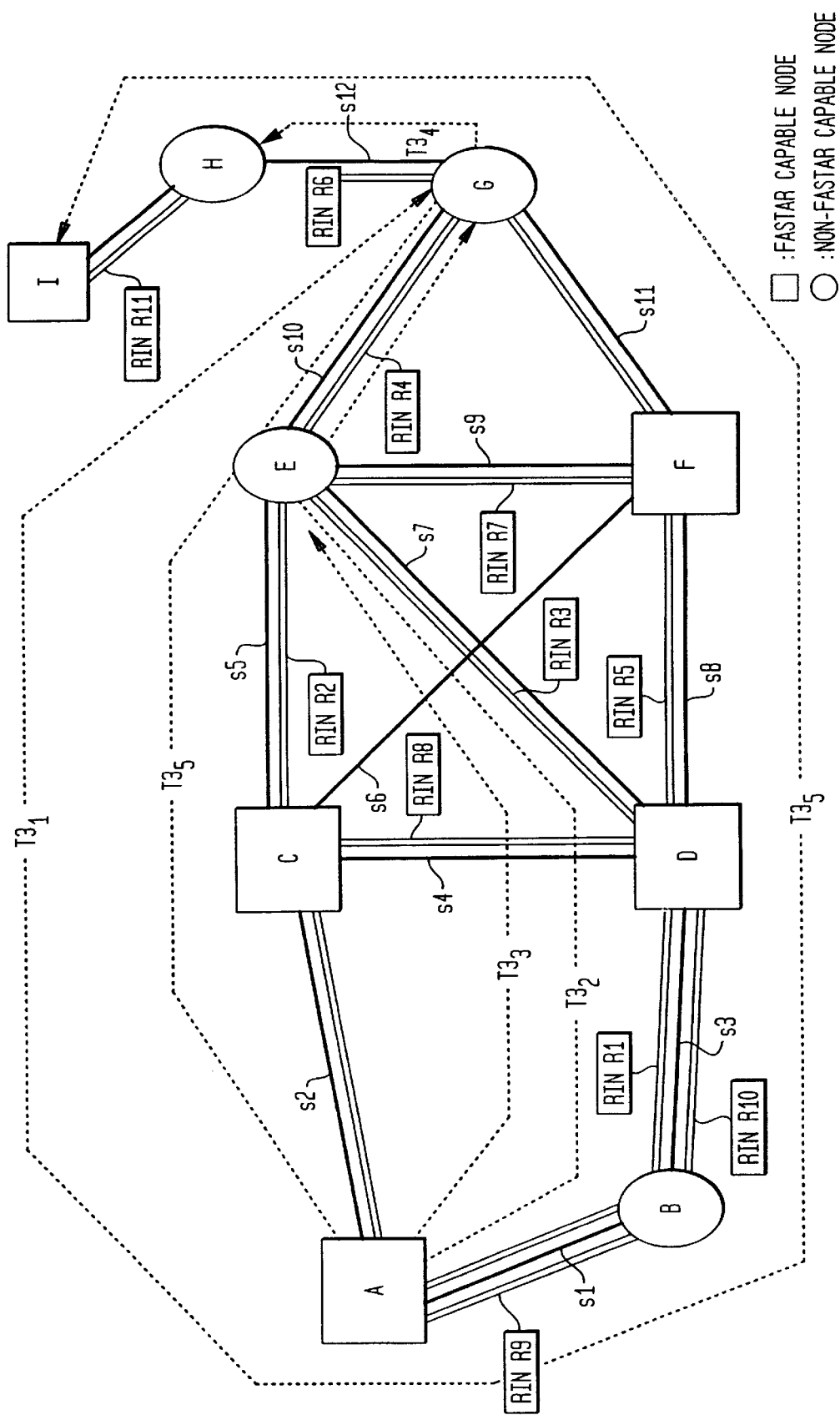
FIG. 1 illustrates a simplified example of a network comprising a plurality of nodes and a plurality of links interconnecting pairs of nodes.

An oversimplified example of a portion of an AT&T network is shown in FIG. 1. The network can be expressed in terms of a four-level restoration hierarchy which includes a physical level, a technology level or capacity level, a T3 level and a T1 level.

The physical level comprises fiber spans, e.g., s1 through s13. A fiber span refers to a fundamental physical component in the network connecting two terminals. A span may fail, whether by digging, train wreak, flood, or various other scenarios. The key information relating to a span includes a span identifier (ID), termination points and length.

The capacity level comprises Route Identification Numbers (RINs), e.g., RIN 1 through RIN 11. RINs identify the routes of a common transport technology across the facility network. A RIN is typically comprised of a series of spans with uniquely defined endpoints, which are typically DACS III nodes in the AT&T network. In the event of a failure, the FASTAR system is able to access restoration capacity on RINs and rearrange the routing of failed T3s automatically.

A T3 is a basic unit of demand (45 Mbps) for which the transport network is engineered and designed. Each T3, for example, $T3_1$ through $T3_5$, is routed over a sequence of RINs. The T3s are either individual demands at that rate or are composed of a set of T1 demands riding on that T3.

A T1 is an engineered element for service. T1s are aggregated for all services to determine the number of T3s that the transport network needs to provide. Vulnerability estimation of lost calls occurs on message trunks at the T1 level.

The above description of the AT&T network, the FASTAR system and the RAPID system are provided as background information to facilitate discussion of the invention and should not be construed to limit the scope of the invention.

Turning to the detailed description of the first embodiment of the invention, FIG. 2 illustrates the components of a preferred computerized system 10 which is configured to determine an optimal restoration capacity and/or optimal restoration paths through the use of linear programming. Computerized system 10 preferably includes certain standard hardware components, such as a processor 12, random access memory (RAM) 14, read only memory (ROM) 16, operating system 17, output device 18, input device 20, a communication port 22, data storage device 26, all of which may be coupled across a shared or dedicated bus system 24. The ROM 16 and/or data storage device 26 are operable to store one or more instructions, discussed further below in conjunction with FIGS. 4 through 7 and 11 through 13, which processor 12 is operable to retrieve, interpret and execute.

Data storage device 26 preferably stores an LP restoration process 28 which, in combination with processor 12, determines an optimal restoration capacity and/or optimal restoration paths for a network to resolve a restoration scenario, through the use of linear programming. LP restoration process 28 preferably includes a data preparation process 30 for reducing the amount of network data needed to solve the LP model; path generation process 34 for generating possible restoration paths for a given restoration scenario or problem; an integerization process 36 for changing the LP solution to integer form; and a disaggregation process 32 for converting the integer LP solution back to an original network data format or an equivalent thereof. Data storage device 26 also stores an LP solver tool 42 for solving an LP model, network data 40 corresponding to a network to be optimized for the restoration scenario, and network tool kit 38 for determining a set of network paths that need to be restored mimicking the RAPID system to generate restoration paths for a restoration scenario through the restoration capacity.

LP solver tool 42 may be a commercially available linear programming solver, such as CPLEX which is designed by ILOG CPLEX Division of Incline Village, Nevada. Such LP solver tools are able to solve LP models using various known techniques, e.g., the simplex, dual simplex or network optimization techniques.

Network tool kit 38 is a network planning tool that estimates blocking at a node (e.g., 4ESS switch) during network failures, such as cable cuts or DACS III office failures. The blocking approximations in the network tool kit 38 map lost network capacity to blocking estimates and use a database resident in the tool to account for restoration of capacity via a restoration architecture, such as FASTAR. Network tool kit 38 can be used to determine a set of demands to be restored to meet DMOQ for the restoration scenario and to generate restoration paths for a restoration scenario through the restoration capacity, an example of the path generation process described below with reference to FIGS. 16 and 17. Additionally, the network tool kit 38 could be used to determine the set of demands to be restored to meet other DMOQs. Network tool kit 38 is preferably configured to mimic or simulate the restoration process of the RAPID system.

Network data 40 includes information pertaining to the network to be optimized, for example, the network shown in FIG. 1. Network data 40 preferably includes a node table 50, a span table 58, a RIN table 70 and a demand table 82, examples of which are described below with reference to FIGS. 3A through 3D, respectively.

FIG. 3A illustrates an exemplary example of a node table 50 which preferably maintains a node field 52, FASTAR Capable Node field 54 and Termination-Limited Node field 56. Node field 52 identifies the nodes in the network. FASTAR Capable Node field 54 indicates whether a node incorporates the restoration technology of the FASTAR system, as described above. Termination-Limited Node field 56 indicates whether a node is a termination-limited node and, thus, non-augmentable meaning that new builds or new augments may not be added to the node.

FIG. 3B illustrates an exemplary example of a span table 58, which preferably maintains a span field 60, a first termination node field 62, a second termination node field 64, a span length field 66 and an affected RIN field 68. Span field 60 identifies the spans of the network. The first and second termination node fields 62 and.64 identify the endpoints of a span. The span length field 66 identifies the length of the span. The affected RIN field 68 identifies all affected RINs in the event of a span failure.

FIG. 3C illustrates an exemplary example of a RIN table 70 which preferably maintains a RIN field 72, a first termination node field 74, a second termination node field 76, a span field 78 and a capacity field 80. RIN field 72 identifies the RINs of the network. The first and second termination node fields 74 and 76 identify the endpoints of a RIN. The span field 78 identifies the spans that form a RIN. For example, RIN R5 is formed of spans s8 and s11. The capacity field 80 identifies the capacity of a RIN.

FIG. 3D illustrates an exemplary example of a demand table 82 which preferably maintains a demand field 84, an originating node field 86, a terminating node field 88, a service path (also referred to as network path) field 90 and a quantity field 92. The demand field 84 identifies the demands, in this example T3s, of the network. The originating and the terminating node fields 86 and 88 identify the beginning and end nodes, respectively, of a demand. The service path field 90 identifies the service path of a demand. For example, the demand $T3_5$ of FIG. 1 is formed of RINs R2, R9, R10, R5, R6 and R11. The quantity field 92 indicates the amount of T3s with the same service path. As will be understood below, the quantity field 92 is used by data preparation process 30 to facilitate aggregation of parallel demands (e.g., quantity fields of aggregated demands are added).

While the above describes one possible arrangement of computerized system 10, computerized system 10 may take the form of other systems, such as an IBM compatible personal computer, a mainframe computer, a supercomputer and so forth. The functionality of computerized system 10 may also be distributed among a plurality of computers to accomplish the same.

Figure 4:
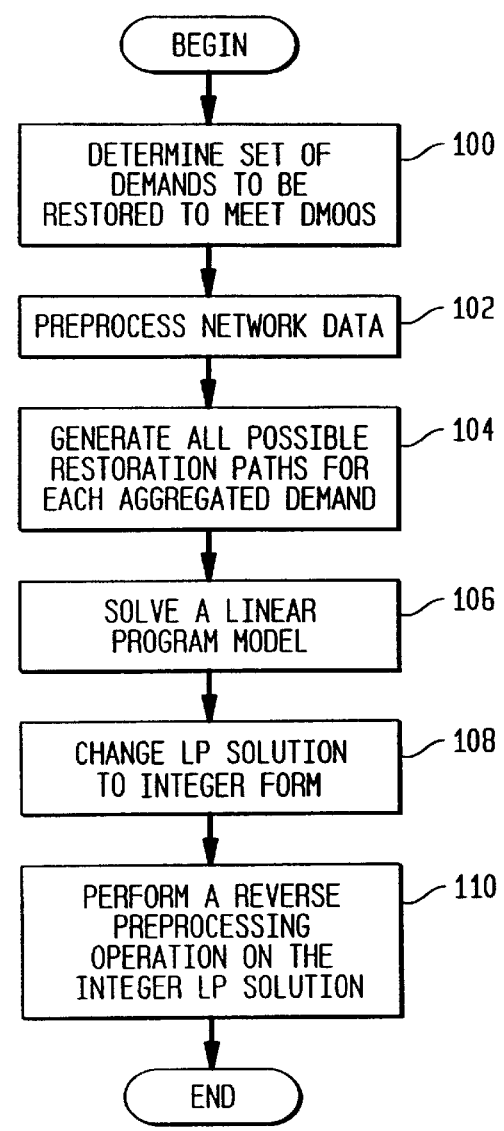
FIG. 4 is a flowchart illustrating an exemplary process to determine an optimal restoration capacity and/or optimal restoration paths for a network to resolve a restoration scenario or problem in accordance with the first embodiment of the invention.

FIG. 4 is a flowchart illustrating a first embodiment of an exemplary LP restoration process 28 by which computerized system 10 solves a restoration scenario through the use of linear programming. At block 100, computerized system 10 finds a set of network paths, in this example T3 demands, that need to be restored preferably to meet DMOQ through the use of network tool kit 38. Next, computerized system 10 preprocesses network data corresponding to the network to be optimized to reduce LP processing workload and time (e.g., by aggregating network data) at block 102 through the use of data preparation process 30. Data preparation process 30 generally involves the aggregation of network data, such as the RINs, demands and equivalent spans, the process of which is described in greater detail below with reference to FIGS. 3 through 9.

At block 104, computerized system 10 generates all possible restoration paths for each aggregated demand. Thereafter, computerized system 10 determines a solution to an LP model formulated to solve the restoration scenario, through the use of LP solver tool 42 and the generated possible restoration paths at block 106. For example, a basic restoration scenario may require a determination of the minimal number of restoration capacity, e.g., RIN augments, and the placement thereof in the network to satisfy demand for all span failures and to conserve capacity. An exemplary example of a primal LP model formulated to solve the basic restoration scenario is provided below in Example #1 and is expressed in terms of LP Notations, LP Decision Variables, LP Objective Function and LP Constraints.

EXAMPLE #1

LP Notations

S: set of spans in the network;

R: RINs with FASTAR capable endpoints that have embedded restoration capacity or are augmentable;

$T_s$: T3s that need restoration given that span s∈S fails;

$d_{st}$: number of T3s of aggregated type t∈$T_s$ that need restoration if span s∈S fails;

$P_{st}$: set of restoration paths available for T3 t∈$T_s$ if span s∈S fails (includes a dummy path for unrestorable T3s);

$Q_{rst}$: set of paths in $P_{st}$ that ride on RIN r∈R;

$c_{ry}$: cost to build a new RIN r∈R;

$c_d$: cost of using dummy restoration paths; and $z_{rs}$: embedded restoration capacity of RIN r∈R if span s∈S fails.

LP Decision Variables $y_r$: new restoration capacity of RIN r∈R; and $x_{ist}$: number of T3s of type t∈$T_s$ routed on path i if span s∈S fails (including a dummy path for each T3).

LP Objective Function $$\text{Min} \sum_r c_{ry} y_r + \sum_{\text{dummy\_paths}} c_d x_{dst}$$

where $c_{ry}$ is a small number and $c_d$ is a large number, e.g., 1 and 100 respectively. Since not all T3s can always be rerouted, due to network topology and individual RIN limits, dummy paths $X_{dst}$ are included to accommodate this situation.

LP Constraints (1) Restore the demand: The demand for T3 t∈$T_s$ must be rerouted.

$$\sum_i x_{ist} = d_{st} \quad \forall s \in S, t \in T_s;$$

(2) Satisfy capacity: The capacity needed for RIN r∈R must be less than or equal to the sum of the new capacity plus the embedded capacity.

$$\sum_t \sum_{i \in Q_{rst}} x_{ist} - y_r \leq z_{rs} \quad \forall r \in R, s \in S; \text{ and}$$

(3) Non-Negative: Each of the decision variables must be non-negative:

$$x_{ist} \geq 0, y_r \geq 0.$$

By solving the above basic LP model shown in Example #1 for the restoration scenario, it is possible to determine the optimal restoration capacity ($y_r$) and/or the optimal path restoration ($x_{ist}$) for all span failures in order to restore completely the demand and to conserve capacity.

Although the above LP model is expressed in the primal form, it should be understood that the LP model of Example #1 may be expressed in other known LP model formats, such as a dual formulation ("dual form"), an example of which is provided below in Example #2.

EXAMPLE #2

LP Notations

All the notations defined in the primal of Example #1 remain valid; and $RP_{ist}$: the set of RINs along path i of T3 t (if span s fails)

LP Dual Variables $u_{st}$: corresponds to the demand constraints $v_{rs}$: corresponds to the capacity constraints LP Objective Function $$\text{Min} - \sum_s \sum_{t \in T_s} d_{st} u_{st} + \sum_r \sum_s z_{rs} v_{rs}$$

LP Constraints

For regular paths:

$$-u_{st} + \sum_{r \in RP_{ist}} v_{rs} \geq 0 \quad \forall i \in P_{st}, t \in T_s, s \in S$$

For dummy paths:

$$u_{st} \leq c_d$$

For new RIN r augments:

$$\sum_s v_{rs} \leq c_{ry}$$

$v_{rs} \geq 0$, $u_{st}$ unrestricted

After the optimal LP solution is found, computerized system 10 changes the LP solution to integer form, if necessary, through the use of integerization processes 36 at block 108, the processes of which is described in further detail below with reference to FIGS. 12 and 13. Depending on the application, an integer LP solution may be determined for the optimal restoration capacity or the optimal restoration paths or both. At block 1 10, computerized system 10 performs a reverse data preparation operation on the integer solution to change the integer solution back to an original format of the network data or equivalent thereof. For example, computerized system 10 disaggregates the integer solution by implementing disaggregation process 32 which performs the reverse operations of data preparation process 30.

As can be appreciated, the resulting solution to the restoration scenario may be utilized for a variety of purposes, such as to facilitate design of reliable networks and to optimize the use of restoration capacity in an existing network and/or to find optimal restoration path(s) for a given restoration scenario. The resulting solution may also be provided to a network restoration architecture or system which may use the recommend optimal restoration capacity or optimal restoration path(s) to restore traffic in a network due to some network failure. In addition, the invention provides a useful tool to test the efficacy of restoration processes and algorithms, such as the above-described restoration process RAPID, and to facilitate the design or redesign of such processes.

In a preferred embodiment, the resulting solution, particularly the optimal restoration capacity, may be provided to a FASTAR capable network (as discussed above) and utilized by the network to perform online restoration of network traffic in the event of some network failure. For example, the non-embedded recommended optimal restoration capacity, such as new augments and/or uncabled capacity (e.g., cheap capacity), are enabled or incorporated in the existing network accordingly. The FASTAR system, particularly the operations system of RAPID, is provided with the recommended optimal restoration capacity, either manually or automatically via communication port 20. The operations system may then utilize the recommended restoration capacity to perform online restoration. In this way, the network may incorporate new capacity, return capacity for services and/or redesignate existing capacity in the network for restoration purposes in a cost-efficient and effective manner to increase the network overall reliability.

Figure 5:
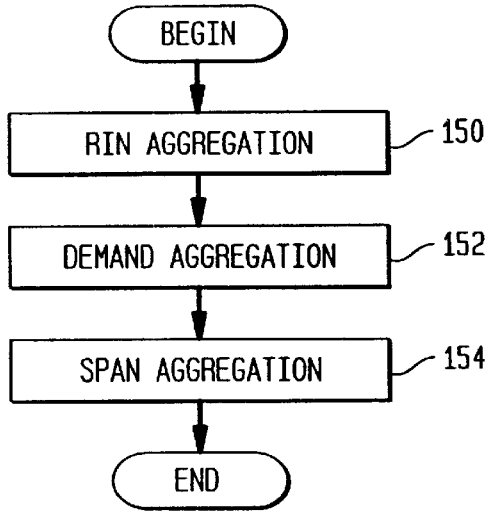
FIG. 5 is a flowchart illustrating an exemplary process by which network data, such as RINs, demands, spans and so forth, is preprocessed to reduce the overall LP processing workload and time.

FIG. 5 is a flowchart illustrating an exemplary process by which computerized system 10 in accordance with data preparation process 30 preprocesses the network data, such as RINs, demands, spans and so forth, to reduce the size of the problem to be solved and to identify acceptable spans, nodes and RINs that may be utilized as part of the restoration scheme to solve the LP model. As shown in FIG. 5, computerized system 10 preferably aggregates the network data corresponding to the RINs at block 150, the demands at block 152 and the equivalent spans at block 154, the above aggregation processes being described below in greater detail below with reference to FIGS. 6 through 11. In this way, the network data necessary to generate restoration paths and to solve the LP model is reduced, thereby reducing the overall LP processing workload and time.

Figure 6:
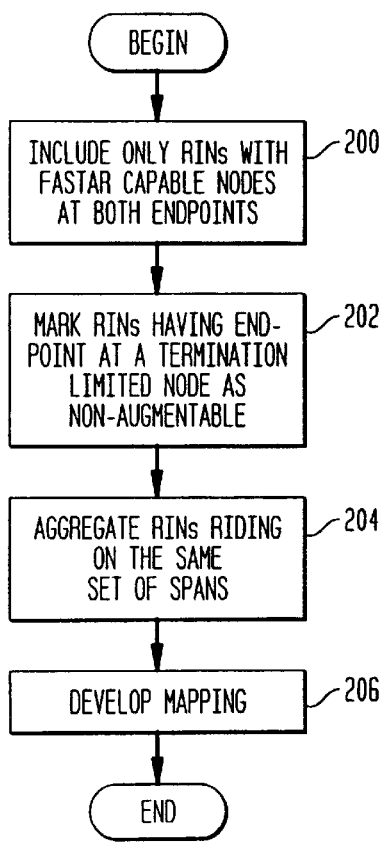
FIG. 6 illustrates an exemplary portion of the process of FIG. 5 by which RINs are aggregated.

Referring to FIG. 6, there is provided a flowchart illustrating an exemplary example of the RIN aggregation process of FIG. 5. At block 200, computerized system 10 analyzes network data corresponding to the RINs in the network and excludes RINS with any non-FASTAR capable nodes at either endpoints. In this way, non-FASTAR capable nodes are excluded from the LP solution and the LP solution, particularly the optimal restoration capacity, may be utilized by FASTAR. At block 202, computerized system 10 marks RINs having an endpoint at a termination-limited node as non-augmentable. Finally, computerized system 10 aggregates RINs riding on the same set of spans at block 204 and develops a mapping for the RINs at block 206.

Figure 7:
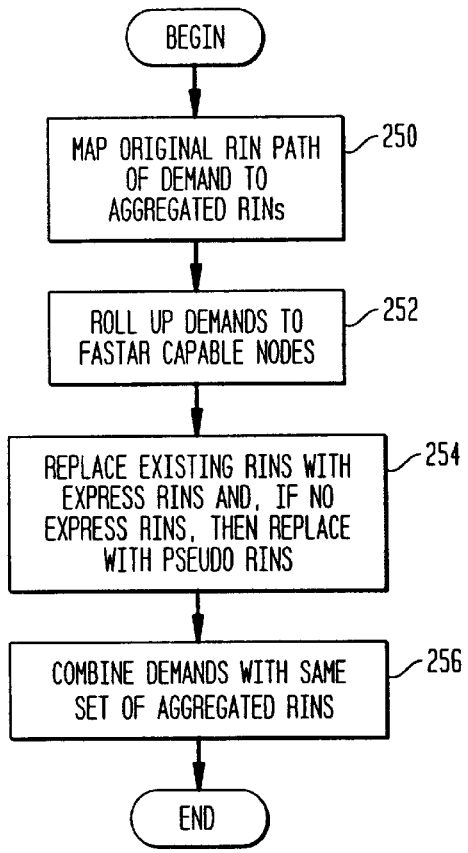
FIG. 7 illustrates an exemplary portion of the process of FIG. 5 by which demands are aggregated.

FIG. 7 is a flowchart illustrating an exemplary example of the demand aggregation process of FIG. 4. At block 250, computerized system 10 maps original RIN paths of a demand to the aggregated RINs of FIG. 6. Next, the demand is rolled up to FASTAR capable nodes at block 252. At block 254, computerized system 10 replaces existing RINs with express RINs for the demand. If there are no express RINs for an existing RIN, computerized system 10 replaces the existing RIN with a pseudo RIN. Thereafter, computerized system 10 combines the demands with the same set of aggregated RINs to eliminate duplicative or parallel demands at block 256. Computerized system 10 performs the demand aggregation process on each demand.

Figure 8:
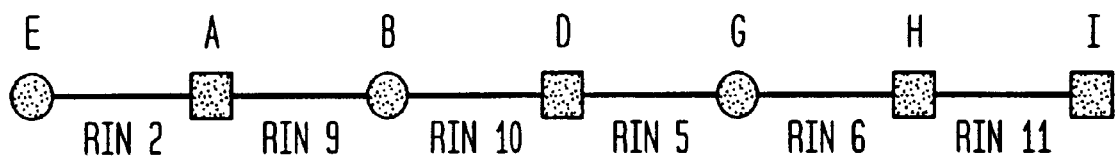
FIGS. 8, 9 and 10 illustrate graphical representations of a part of the preprocessing operation of FIG. 6 implemented on an original T3 demand of FIG. 1.

To better understand the demand aggregation process of FIG. 7, an operational example of the process is described below with reference to FIGS. 8, 9 and 10. As shown in FIG. 8, an original T3 of FIG. 1, for example, includes a plurality of nodes and links. The squares represent FASTAR capable nodes (e.g., nodes A, D, H and I), the circles represent non-FASTAR capable nodes (e.g., nodes E, B and G), and the line segments represent RINs (e.g., RINs R2, R9, R10, R5, R6 and R11).

Figure 9:
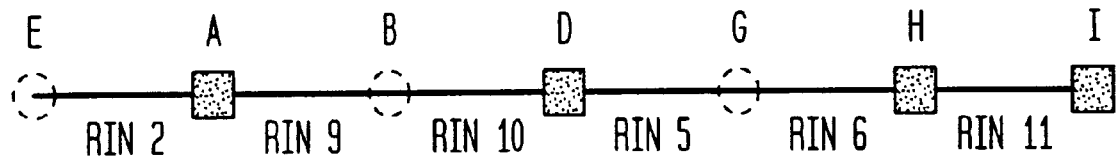
Figure 10:

FIGS. 9 and 10 illustrate an aggregated T3 after the preferred demand aggregation process is performed on the T3 of FIG. 8. The dashed unfilled nodes are merely shown to illustrate those nodes that are no longer part of the T3. Through a condensing process, the non-FASTAR capable nodes E, B and G are removed from the T3. As shown, the removal of an originating node E results in a gap prior to the FASTAR capable node A. Since node E is an originating node, the T3 is rolled up to the FASTAR capable node A and RIN R2 is removed.

For the other non-FASTAR capable nodes, the condensing process results in gaps between nodes A and D and nodes D and H. To fill the gaps, pre-existing express RINs are utilized initially to connect the nodes with gaps therebetween, if possible. For example, a pre-existing express RIN R1 is used to connect nodes A and D. In the situation in which there is no pre-existing express RIN to fill a gap, a pseudo RIN is used instead to connect the nodes of that gap. For example, the nodes D and H are connected across a pseudo RIN. The remaining unaffected RIN R11 connected between nodes H and G is mapped to itself.

The resulting aggregated T3 is shown in FIG. 10. It should be understood that the pseudo RINs, e.g., between nodes D and H, are only used to make the existing paths seem connected for the benefit of LP solver tool 42. The pseudo RINs are not available for restoration purposes and are excluded from the LP solution.

In a preferred embodiment, the demand aggregation process generally simulates the actual operations performed by the RAPID operations system (described above) to process the network data in-real time in order to determine suitable restoration paths in the event of an actual network failure. The RAPID restoration process also condenses out non-FASTAR capable nodes that can not be used to restore network traffic.

Figure 11:
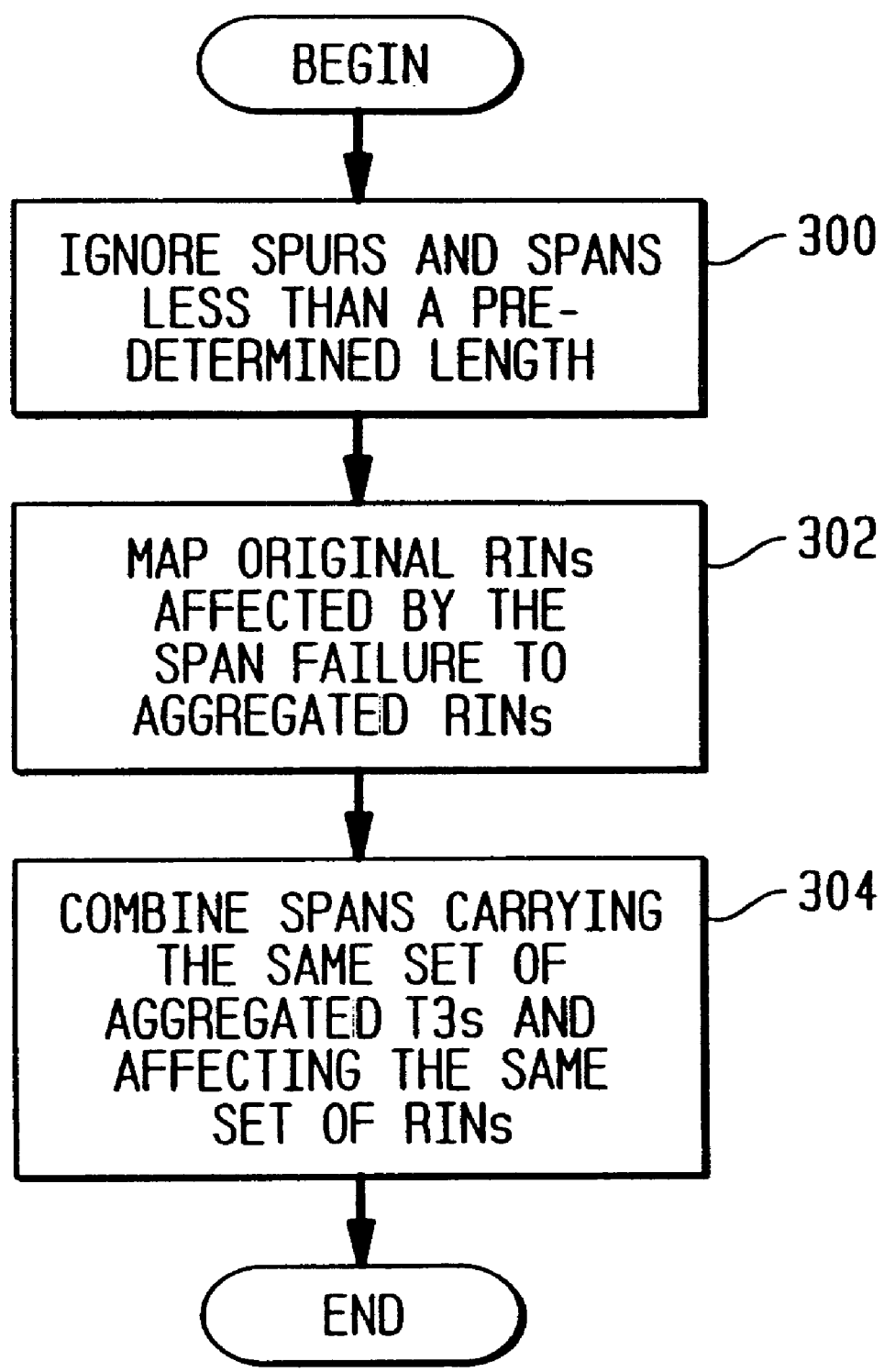
FIG. 11 illustrates an exemplary portion of the process of FIG. 5 by which spans are aggregated.

FIG. 11 is a flowchart illustrating an exemplary process by which equivalent spans are aggregated. At block 300, computerized system 10 analyzes the spurs and spans in the network and excludes any spur and span less than a predetermined length. Such spans are typically located within AT&T nodes and other means are used to protect them. Next, computerized system 10 maps the original RINs affected by the span failure to the aggregated RINs at block 302. Thereafter, computerized system 10 combines spans carrying the same set of aggregated T3s and affecting the same set of RINs at block 304.

Once the network data is preprocessed and an LP model is solved, it is necessary to obtain an integer solution for the LP solution, namely for the restoration capacity variables (e.g., $y_r$) and/or the restoration path variables (e.g., $x_{ist}$). Given that LP models have special structures, the optimal values of the solution variables are often integers. For a relatively large problem, it is possible to obtain an entire integer solution. However, an integer solution is not necessarily guaranteed.

A simple approach to obtain an integer solution is by rounding non-integer values of the LP solution to the next integer value. However, such an approach has several shortcomings. For example, rounding up the restoration capacity values may result in an non-optimal incorporation and use of restoration capacity in the network, thereby increasing the overall cost of the network. Rounding up the path variables to the next integer may not always result in a feasible solution.

Alternatively, heuristic approaches may be used to change the LP solution into a feasible integer solution, exemplary examples of which are described with reference to FIGS. 12 and 13 which are flowcharts illustrating exemplary integerization processes 36 by which the LP restoration capacity solution is integerized ("capacity integerization process") and by which the LP restoration path solution is integerized ("path integerization process"), respectively. As used hereinafter, the term "round-up" refers to increasing a quantity to the smallest integer greater than or equal to that quantity. Similarly, the term "round-down" refers to decreasing a quantity to the largest integer less than or equal to the quantity.

Figure 12:
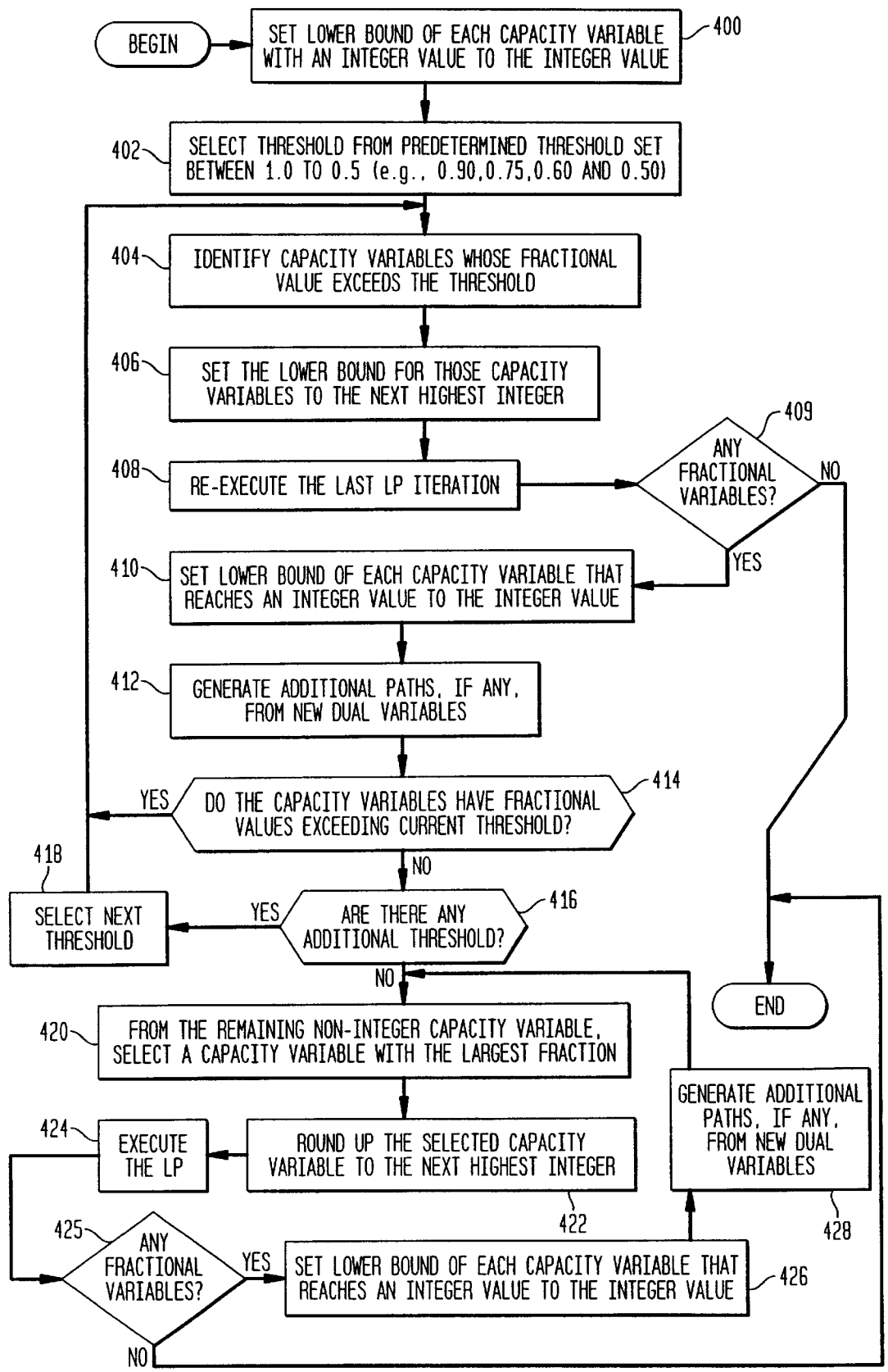
FIG. 12 is a flowchart illustrating an exemplary process by which the optimal LP restoration capacity solution is integerized.

As shown in FIG. 12, computerized system 10 initiates the capacity integerization process by setting a lower bound of each restoration capacity variable with an integer value to that rounded down integer value at block 400. At block 402, computerized system 10 selects an initial threshold from a predetermined threshold set between the values of 1.0 and 0.5, for example, 0.90, 0.75, 0.60 and 0.50. Computerized system 10 then identifies restoration capacity variables whose fractional value exceeds the selected threshold at block 404 and sets the lower bound for those capacity variables to the rounded up value. At block 408, the previous LP iteration is re-executed.

Thereafter, computerized system 10 checks if there exist any fractional variables at block 409. If not, the capacity integerization process is terminated. If fractional variables exist, computerized system 10 sets the lower bound of each restoration capacity variable that reaches an integer value to that integer value at block 410 and generates additional restoration paths, if any, with the new LP dual variables of the restoration capacity variable. If the new capacity variable values have fractional values exceeding the current selected threshold, then computerized system 10 repeats blocks 404 through 412. Otherwise, computerized system 10 checks whether there are any additional thresholds that have not been selected at block 416. If so, the next threshold is selected from the predetermined threshold set at block 418, and blocks 404 through 414 are repeated with the newly selected threshold.

If all thresholds have been selected from the predetermined set, then computerized system 10 preferably selects a restoration capacity variable with the largest fractional value from the remaining non-integer restoration capacity variables at block 420, and the selected restoration capacity variable is round-up to the next highest integer value at block 422. In the case that there are several variables with the same largest fraction, computerized system 10 may either select one arbitrarily, the one with the largest or smallest value (depending on the design philosophy). At block 424, the LP model is executed with the new values. After the LP execution, computerized system 10 checks if there exist any fractional variables at block 425. If not, the capacity integerization process is terminated. If fractional variables exist, computerized system 10 then sets the lower bound of each restoration capacity variable that reaches an integer value to that integer value at block 426. Thereafter, computerized system 10 generates additional restoration paths, if any, with the new LP dual variables. Then, blocks 420 through 428 are repeated.

Figure 13:
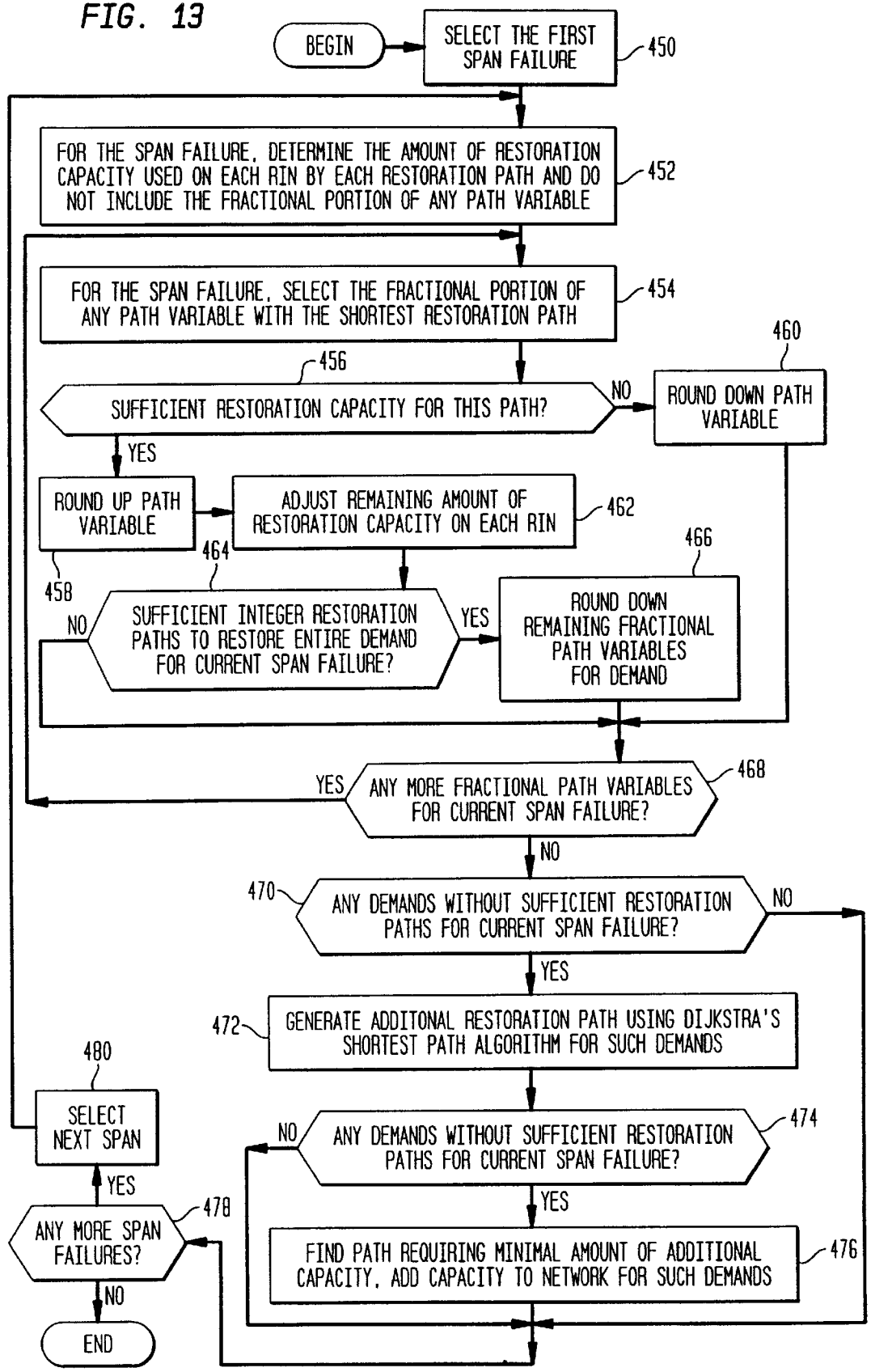
FIG. 13 is a flowchart illustrating an exemplary process by which the optimal LP restoration path solution is integerized.

Referring to FIG. 13, computerized system 10 initiates the path integerization process by selecting an initial span failure at block 450. Computerized system 10 then determines the amount of restoration capacity used on each RIN by each restoration path, for the span failure at block 452. The fractional portion of any path variable is not counted. At block 454, for the span failure, the fractional portion of any restoration path variable with the shortest restoration path is selected. In the event of a tie, the largest fractional value is used as a tiebreaker. Another option is to chose a path that causes the smallest net increase in the value of the LP objective function. Each time the value of a path variable is changed, the LP constraints cause the value of the other path variables to changes, e.g., to increase or decrease. In the alternative, the restoration path with largest fractional value may be chosen, using shortest length as a tiebreaker; or the shortest restoration path for each network path, in this example a demand, may be found, with the longest of the shortest restoration paths being selected to break the tie.

At block 456, computerized system 10 checks whether there is sufficient restoration capacity for the selected restoration path. If not, the restoration path variable is round-down at block 460 and the process proceeds to block 468 described below.

Otherwise, the value of the restoration path variable is round-up at block 458 and the remaining amount of restoration capacity on each RIN is adjusted at block 462. Computerized system 10 then checks whether there are sufficient restoration paths to restore the entire demand for that demand for the current span failure at block 464. If so, computerized system 10 rounds down the remaining restoration path variables with fractional values for the demand at block 466.

In any event, the process continues at block 468 in which computerized system 10 checks whether there are any more fractional restoration path variables for the current span failure. If so, the process is returned to block 454 and blocks 454 through 468 are repeated until there are no more fractional restoration path variables for the current span failure.

If there are no longer any more fractional restoration path variables for the current span failure, computerized system 10 checks whether there are any demands without sufficient restoration paths for the current span failure at block 470. If not, the process goes to block 478 to check for any more span failures. Otherwise, computerized system 10 generates additional restoration paths that use existing capacity through the use of a shortest path algorithm, such as Dijkstra's shortest path algorithm, for such demands at block 472. When using Dijkstra, the link length is preferably set to 0 if the link is part of the original service path, or set to 1 if the link is not on the service path but has remaining restoration capacity, or set to infinity (or a sufficiently large value) if there is no remaining restoration capacity or the RIN was disabled by the current span failure. This process block is repeated for all demands without sufficient restoration paths.

Thereafter, at block 474, computerized system 10 determines whether there are any demands without sufficient restoration paths for the current span failure. If so, computerized system 10 finds restoration paths that requires a minimal amount of additional restoration capacity, e.g., augments, for such demands at block 476. In both cases, the process then goes to block 478.

At block 478, computerized system 10 determined whether there are any more span failures. If so, computerized system 10 selects the next span failure and repeats blocks 452 through 478. Otherwise, the path generation process is terminated.

Some applications of the invention may only require the optimal restoration capacity, the optimal restoration paths or both. For example, the LP restoration path solution, e.g., $x_{isr}$, may be unnecessary when solving restoration problems for networks with FASTAR capability that perform real-time restoration. For FASTAR capable networks, integer solutions may only be required for the restoration capacity, e.g., $y_r$, which is a simpler task than finding integer solutions for the restoration path solution. Given that FASTAR may not use the restoration capacity as efficiently as the LP model and that the number of restoration capacity on a given RIN can be in the 10's or higher, the simple heuristic round-up routine, as described above, is adequate to resolve network restoration problems for a FASTAR-type system.

Although the system and method of the first embodiment is able to compute an optimal restoration capacity and/or optimal restoration paths for a given network faced with a given restoration scenario, the generation of all restoration paths for input into the LP model may become impractical when dealing with large networks. That is, in some instances, even after aggregation of the network data, there are still tens of spans, hundreds of RINs, and tens of thousands of demands. It may be computationally impossible to generate all feasible paths for every affected demand. Even if possible, the size of the resulting LP model would be too large to be handled.

To remedy the foregoing problem, there is provided a second embodiment of the invention, which utilizes column generation methods in combination with linear programming to solve the LP model for an optimal restoration capacity and/or optimal restoration paths, while reducing the number of restoration paths needed to be generated. Through the use of column generation methods, restoration paths are only generated when necessary.

Prior to discussing the second embodiment in detail, a general discussion of the column generation technique is provided below. The following notations are defined below to facilitate understanding of column generation, where:

$\vec{a}_j$: jth column of the primal constraint matrix;

B: basis of the primal LP;

$c_B$: costs of the basic variables of the primal LP;

N: matrix of non-basic columns of the primal LP;

$c_N$: costs of the non-basic variables of the primal LP; and b: right hand side of the primal LP.

The general form of a primal LP problem may be expressed with the general objective function:

Max $c_B^T x_B + c_N^T x_N$, and constraints:

s.t. $Bx_B + Nx_N = b$ $x_B \geq 0, x_N \geq 0$.

Since the basis B of the primal LP is invertible, the above expression for the constraint may be rewritten in the following form:

$x = B^{-1}b - B^{-1} Nx_N$.

The objective function can then be written by substituting the above expression for $x_B$ therein to obtain the resulting expression:

$c_B^T B^{-1} b + (c_B^T - c_B^T B^{-1} N)x_N$,

At each LP simplex method iteration, the current solution is $x_B = B^{-1}b$ and $x_N = 0$. If a non-basic variable $x_j$ is increased by $\Delta x_j$, the change to the objective function can be expressed as follows:

$(c_j - c_B^T B^{-1} \vec{a}_j)\Delta x_j$.

If the change to the objective function is greater than zero (i.e., $c_j - c_B^T B^{-1} \vec{a}_j > 0$), then the objective function of the primal LP can be improved.

Assuming that the maximal of $c_j - c_B^T B^{-1} \vec{a}_j$ is found at j=k with $c_k - c_B^T B^{-1} \vec{a}_k > 0$. Then the kth column will enter the basis and the column to leave is determined by the first basic variable to go to zero as $x_k$ increases.

At optimality, $c_N^T - c_B^T B^{-1} N \leq 0$. Note that the following expression:

$$\begin{pmatrix} B^T \\ N^T \end{pmatrix} (c_B^T B^{-1})^T = \begin{pmatrix} c_B \\ N^T B^{T-1} c_B \end{pmatrix} \geq \begin{pmatrix} c_B \\ c_N \end{pmatrix}.$$

Therefore, $(c_B^T B^{-1})^T$ is dual feasible and optimal. At each simplex iteration, $(c_B^T B^{-1})^T$ is the corresponding set of dual variables. For column generation methods, the key is to find a non-basic column that maximizes $c_j - c_B^{T-1} \vec{a}_j$.

In the basic primal LP model described in Example #1, using the dual variable notation of Example #2, for a path variable $x_{ist}$, $$c_j - c_B^T B^{-1} \vec{a}_j = 0 - \left(-u_{st} + \sum_{r \in RP_{ist}} v_{rs}\right) = u_{st} - \sum_{r \in RP_{ist}} v_{rs}.$$

The objective function can then be rewritten in the dual form, as follow:

$$\text{Max}\{c_j - c_B^T B^{-1} \vec{a}_j\} \Leftrightarrow \text{Max}\left\{u_{st} - \sum_{r \in RP_{ist}} v_{rs}\right\} \Leftrightarrow \text{Min}\left\{\sum_{r \in RP_{ist}} v_{rs} - u_{st}\right\}$$

For a fixed span s and a fixed demand t, the best path of an affected network path, e.g., an affected demand, is the one that minimizes $$\sum_{r \in RP_{ist}} v_{rs},$$

i.e., the shortest path from origin to destination where the length of each RIN is given by the dual variable $v_{rs}$. In other words, for a fixed s and t, it is possible to determine the minimum restoration capacity for an affected demand by finding the shortest restoration path.

Turning to the second embodiment of the invention, FIG. 14 illustrates an exemplary example of computerized system 10, which is configured to solve path-based network restoration problems through the use of column generation methods in combination with linear programming. In this embodiment, computerized system 10 generates one path for each network path, in this example a T3 demand, initially. Computerized system 10 then solves an LP model, such as described in Example #2, associated with a restoration scenario, utilizing all of the restoration capacity variables and the restoration path variables generated so far. After each LP has been solved, computerized system 10 utilizes the dual variables of the demand constraint (e.g., $v_{rs}$) to find a shortest restoration path for each demand. If the total length of a shortest restoration path of a demand is less than the dual variable of the capacity constraint (e.g., $u_{st}$) of the demand, the restoration path is a feasible path and is added to the set of restoration paths for the demand. Thereafter, the LP model is solved with the revised set of restoration paths for the demand. These steps are repeated until no feasible restoration paths can be found for any demand or, in other words, the optimal solution is obtained.

Through column generation methods, it is only necessary to generate one restoration path for each demand to solve each LP iteration. Such an approach significantly reduces the number of restoration paths that need to be generated to solve an LP model for a restoration scenario, thereby reducing the overall LP processing workload and time.

As shown in FIG. 14, computerized system 10 preferably includes certain standard hardware components, such as a processor 12, random access memory (RAM) 14, read only memory (ROM) 16, operating system 17, output device 18, input device 20, a communication port 22, data storage device 26, all of which are coupled across a shared or dedicated bus system 24. The ROM 16 and/or data storage device 26 are operable to store one or more instructions, discussed above in conjunction with FIGS. 5 through 7 and 11 through 13 and below in conjunction with FIGS. 15 through 18, which processor 12 is operable to retrieve, interpret and execute.

Data storage device 26 preferably stores an LP restoration process 28A which preferably includes a column generation process 35 which utilizes column generation methods in combination with linear programming to determine an optimal LP solution for at least one of the restoration capacity and the restoration paths. Through column generation, restoration paths are only generated when necessary, thereby reducing the overall processing workload and time to solve the restoration scenario or, more specifically, the LP model. LP restoration process 28A also includes processes previously described above, such as preparation process 30, integerization process 36 and disaggregation process 32. Data storage device 26 also stores an LP solver tool 42 for solving an LP model, network data 40 corresponding to a network to be optimized for the restoration scenario or problem, and network tool kit 38 for finding a set of networks path, e.g., demand, that need to be restored and mimicking the RAPID system to generate restoration paths for the given network, all of which have been described above in detail.

Figure 15:
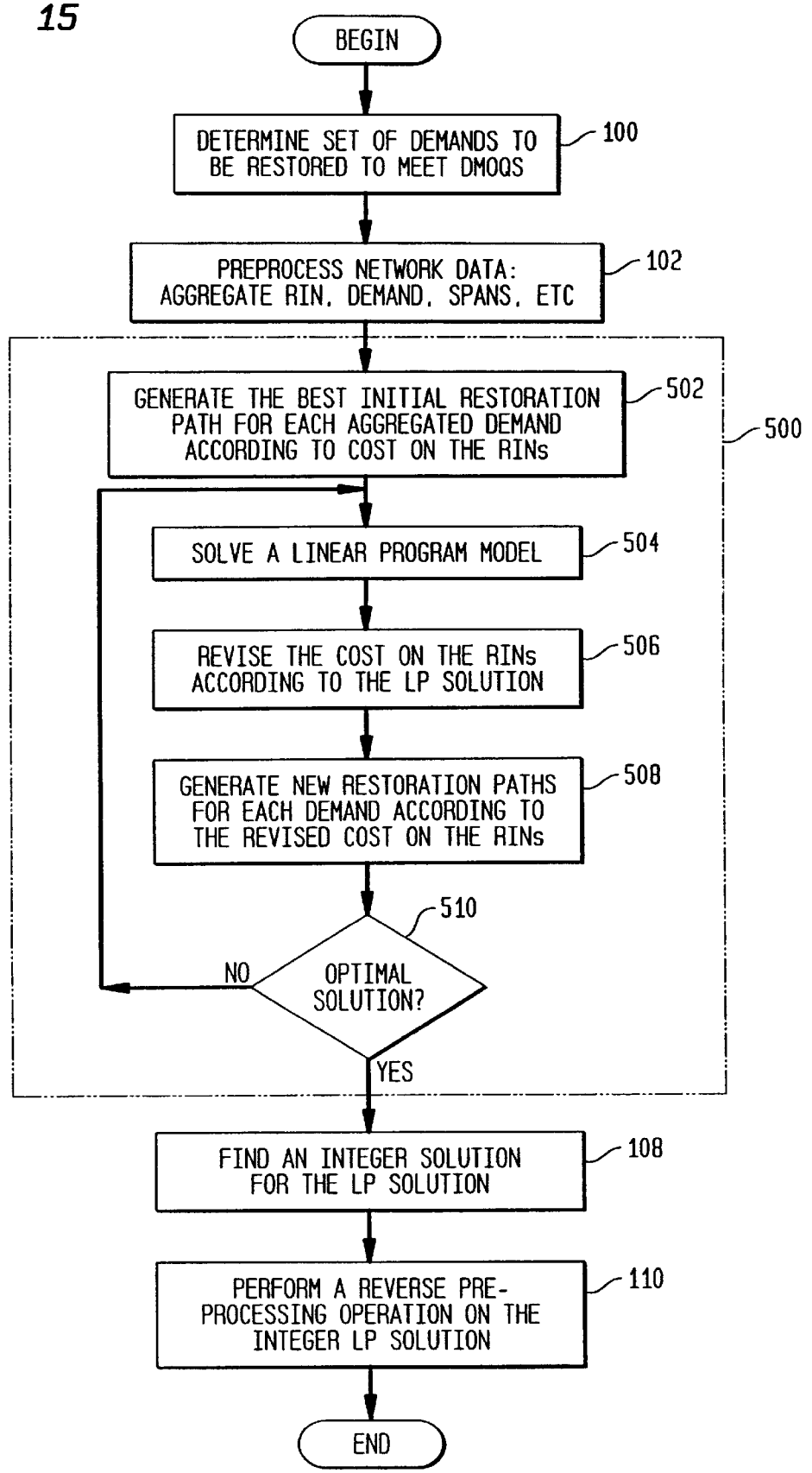
FIG. 15 is a flowchart illustrating an exemplary process by which linear programming in combination with column generation methods are employed to determine an optimal restoration capacity and/or optimal restoration paths for a network to resolve a restoration scenario or problem in accordance with the second embodiment of the invention.

FIG. 15 is a flowchart illustrating the second embodiment of an exemplary LP restoration process 28A by which computerized system 10 solves network restoration problems through the use of linear programming in combination with column generation methods. At block 100, computerized system 10 finds a set of network paths, in this example T3 demands, that need to be restored preferably to meet DMOQ through the use of network tool kit 38. Next, computerized system 10 preprocesses the network data to reduce the overall LP processing workload and time (e.g., by aggregating network data) at block 102 through the use of data preparation process 36. That is, the network data is preprocessed to reduce the overall size of the LP problem to be solved and, thus, the speed of the overall LP solution process. Data preparation process 36 generally involves the aggregation of network data, such as the RINs, demands and equivalent spans, the process of which has been described above with reference to FIGS. 3 through 9.

Thereafter, computerized system 10 implements the column generation process 35 at block 500 which includes blocks 502 through 510 to determine an optimal restoration capacity and/or optimal restoration paths. In particular, at block 502, computerized system 10 generates the best initial restoration path, if any, for each aggregated demand according to initial costs of the RINs (e.g., $a_{ij}$), an example of the initial generation process of which is described below with reference to FIGS. 16 and 17. Computerized system 10 then solves the LP model, for example, described in Example #1, with the initial set of possible restoration paths through the use of LP solver 42 at block 504. The solution to the LP model (e.g., $v_{rs}$) is then used to revise the RIN costs at block 506. Next, new restoration paths, if any, are generated for each demand according to the revised cost on the RINS at block 508, an example of the restoration path generation process described below with reference to FIG. 18. At block 510, computerized system 10 determines whether the solution to the LP model is optimal by checking whether there are any additional feasible restoration paths in the newly generated restoration paths. A restoration path is feasible if the total length of a generated shortest restoration path of a demand is less than the length of the dual restoration path variable of the demand. If a feasible restoration path exists, then the feasible restoration path is added to the set of restoration paths for the demand. Thereafter, computerized system 10 repeats blocks 504, 506 508 and 510 with the revised set of restoration paths and the revised RIN costs until all feasible restoration paths have been found or, in other words, the optimal solution is reached.

After the optimal restoration capacity and/or optimal restoration paths have been found, computerized system 10 determines an integer solution for the LP solution through the use of integerization processes 36 at block 108, the processes of which have been described above with reference to FIGS. 12 and 13. Depending on the application of the invention, an integer solution may be determined for the optimal LP restoration capacity solution or the optimal LP restoration path solution or both. At block 110, computerized system 10 performs a reverse data preparation operation on the integer solution to convert the integer solution back to a format of the original network data or an equivalent thereof. For example, computerized system 10 disaggregates the integer solution by implementing disaggregation process 32 which performs the reverse operations of data preparation process 30.

Figure 16:
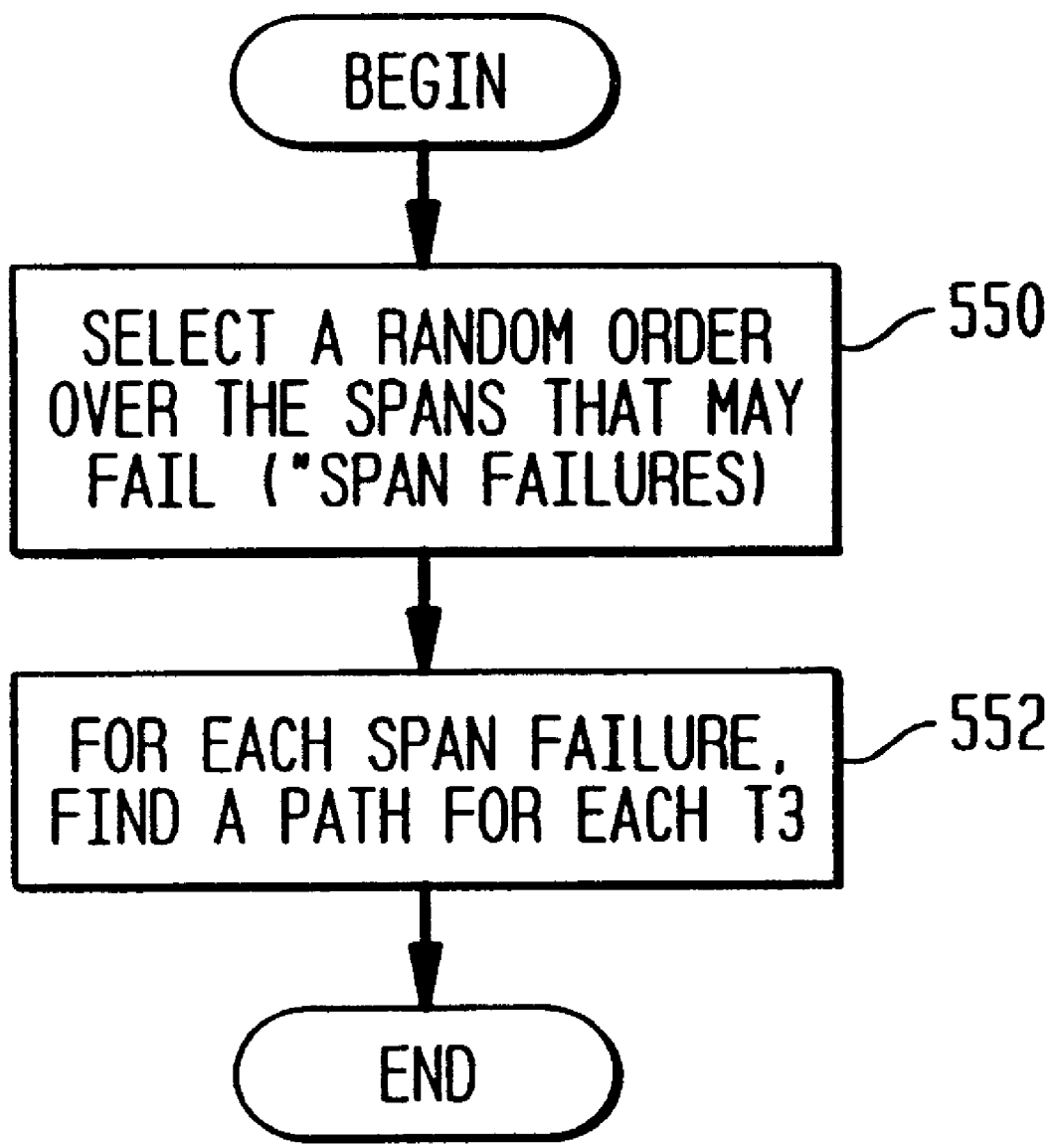
FIGS. 16 and 17 are flowcharts illustrating an exemplary process by which restoration paths are initially generated for the column generation process of FIG. 15.
Figure 17:
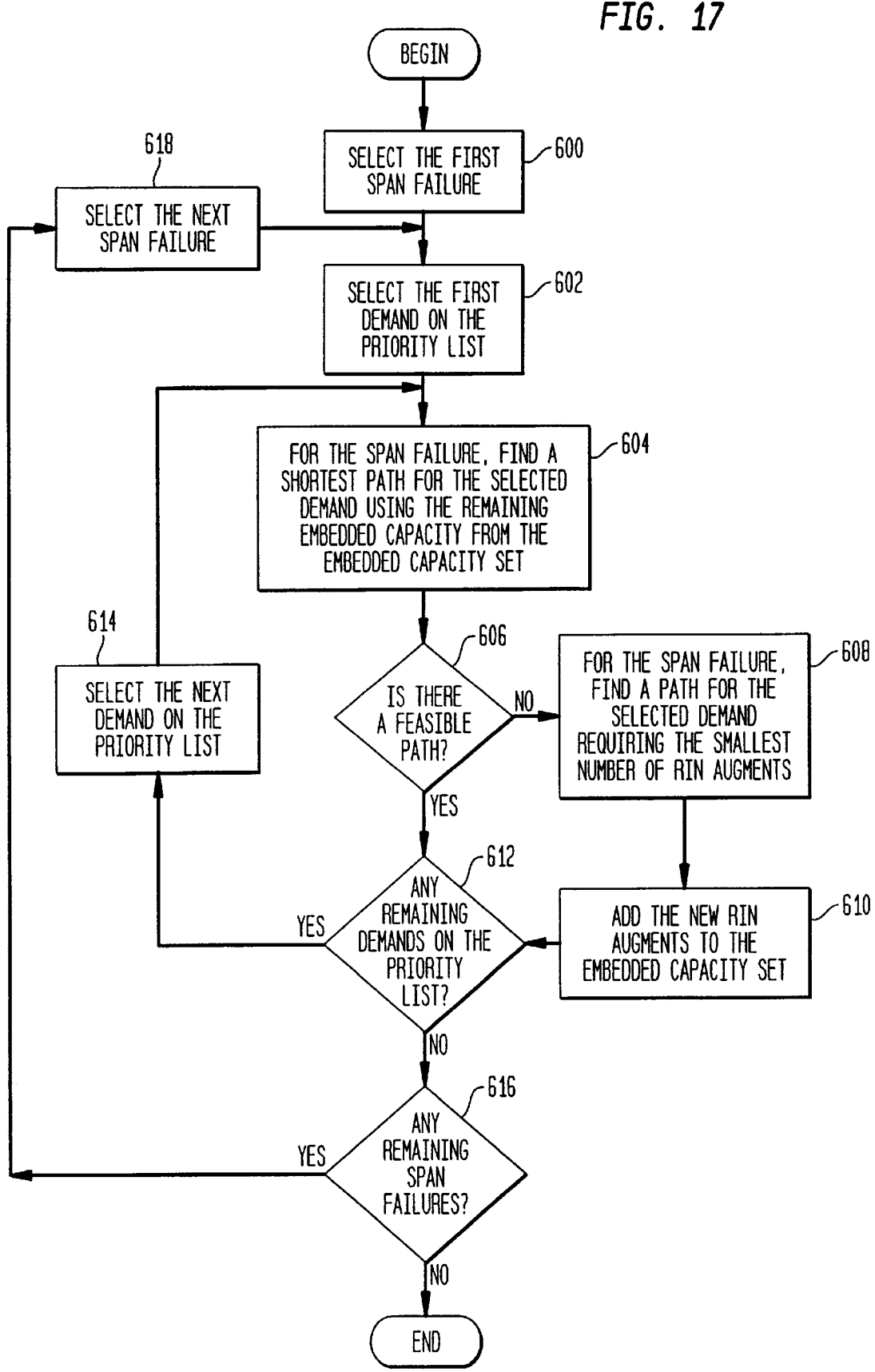

FIG. 16 and 17 are flowcharts illustrating an exemplary process by which restoration paths are initially generated for an initial LP iteration. As shown in FIG. 16, in general, computerized system 10 generates the initial restoration paths by initially selecting a random order over the spans that may fail (span failures) at block 550. Next, for each span failure, computerized system 10 determines a single restoration path for each network path, in this example a T3 demand, according to initial RIN costs (e.g., $a_{ij}$) at block 552. The initial generated restoration paths are preferably generated in a manner similar to that performed by the restoration process of the RAPID system.

For the initial LP iteration, it is preferred that each RIN is initially given a predetermined cost (e.g., 10), except that each RIN with non-FASTAR capable nodes are given an infinite cost, each RIN on the original service path has no cost, (e.g., 0) and each RIN affected by the span failure is given an infinite cost. It should be understood that the RIN cost matrices $\{a_{ij}\}$ for each demand may be different because service paths of the demands may be different. The initial RIN cost structure and the subsequent revised RIN cost structures (described further below) are configured to find restoration paths for a given demand. Since non-FASTAR capable nodes may not be used in the restoration process, the RINs that pass through the non-FASTAR capable nodes also may not be used in the restoration process. This is accomplished by setting an infinite cost for each RIN with non-FASTAR capable nodes.

FIG. 7 illustrates a more detailed description of an example of the initial path generation process which begins at block 600 with the selection of a first span failure from a set of span failures according to the restoration scenario. Next, computerized system 10 selects the first demand preferably according to a demand priority list (not shown) prioritizing the network demands at block 602. The demand may be prioritized according to a variety of factors, such as the type of traffic through the demand and so forth. At block 604, computerized system 10 then determines a shortest restoration path according to the initial RIN costs for the selected span failure and the selected demand. Computerized system 10 preferably uses the remaining embedded capacity from an embedded capacity set corresponding to the available embedded capacity in the network for restoration, to determine the shortest restoration paths. It should be noted that, for a single span failure, the embedded capacity used by one demand will not be available for other demands. Thereafter, computerized system 10 then determines whether a feasible restoration path has been found for the selected span failure and the selected demand at block 606. If not, computerized system 10 determines a restoration path according to the initial RIN costs that require the smallest number of new RIN augments (e.g., new builds) for the selected span failure and the selected demand at block 608. The new RIN augments are then added to the embedded capacity set at block 610 and these augments are available for the next span failure.

Thereafter, in either cases, at block 612, computerized system 10 checks whether there are any remaining demands on the demand priority list. If so, computerized system 10 selects the next demand on the priority list at block 614 and repeats blocks 604 through 612 with the selected demand. If not, computerized system 10 checks whether there are any remaining span failures in the set of span failures at block 616. If any span failures remain, computerized system 10 selects the next span failure from the remaining span failures at block 618 and repeats blocks 602 through 616 with the selected span failure. Otherwise, the initial path generation process is terminated.

Figure 18:
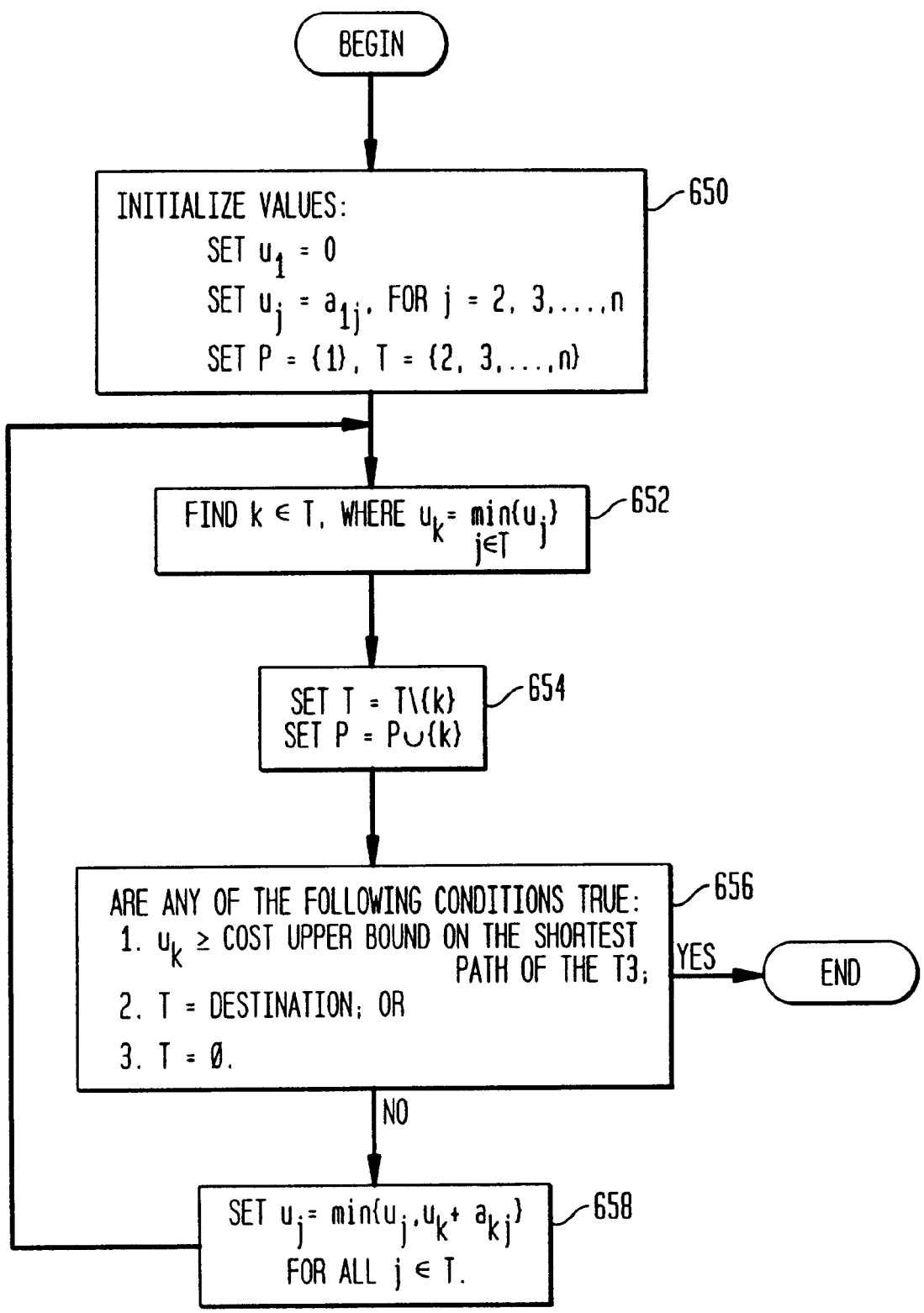
FIG. 18 is a flowchart illustrating an exemplary process by which restoration paths are generated between each LP iteration of the column generation process of FIG. 15 according to a modified Dijkstra's shortest path algorithm.

FIG. 18 is a flowchart illustrating a path generation process by which the restoration paths are generated prior to each normal or subsequent LP iteration (after the initial LP iteration). In the process, a shortest restoration path is generated for each affected demand based on revised RIN costs (e.g., $a_{ij}$) through the use of a modified Dijkstra's shortest path algorithm, an efficient shortest path algorithm whose running time is $O(n^2)$.

In column generation, the dual variables (e.g., $u_{st}$ and $v_{rs}$ of Example #2) can be given an interpretation relative to the shortest path algorithm being solved. In particular, $u_{st}$ may be considered an upper bound on the cost of a shortest path between the origin and destination of demand t. In other words, a restoration path must be shorter than $u_{st}$ to improve the current solution, even though a restoration path greater than $u_{st}$ may be a feasible path. In these shortest path computations, $v_{rs}$ is taken as the cost of RIN r. As such, between each normal LP iteration, it is preferred that each RIN has a revised cost equal to the dual variable (e.g., $v_{rs}$) solved for a previous LP iteration, except that each RIN with non-FASTAR capable nodes are given an infinite cost, each RIN on the original service path has no cost (e.g., 0), and each RIN affected by the span failure is given an infinite cost. By generating the initial and revised RIN cost matrix in the above manner, restoration paths may be generated around failure points, thereby increasing the possibility that a solution recommended by the system and method of the invention may be utilized by the FASTAR system.

The following definitions are provided below to facilitate understanding of the path generation process of FIG. 18, where:

$a_{ij}$
= the (finite) cost of a RIN from node i to node j, if there is such a RIN, or
= ∞, otherwise;

$u_j$ = the cost of a shortest path from the origin to node j;
P: the set of nodes that have been searched;
T: the set of nodes that have not been searched;
origin: the starting node on the service path of a T3; and
destination: the terminating node on the service path of a T3.

As shown in FIG. 18, the path generation process commences at block 650 where computerized system 10 initializes the system values to some default values. For example, the cost of the shortest path of the origin to the origin ($u_1$) is set to zero. The cost of the shortest path of the origin to a node j ($u_j$) is equal to the finite cost of a RIN from node i to node j ($a_{1j}$), for j=2, 3, . . . , n. The set of the nodes that have been searched includes the origin {1}, and the set of nodes to be searched includes nodes {2, 3, . . . , n}.

At block 652, computerized system 10 identifies the adjacent nodes connected to the currently searched node (e.g., initially the originating node 1) and finds an adjacent node (k) from the set T with the shortest path to the currently searched node. The adjacent node with the shortest path (k) is then removed from the set T and added to the set S at block 654.

At block 656, computerized system 10 determines whether any one of the following conditions have been satisfied: (1) the shortest restoration path for an affected demand is greater than the cost upper bound on the shortest path of the demand; (2) the destination node for the affected demand has been reached (e.g., T=destination), or (3) all nodes have been searched for the affected demand or the set of nodes to be search is empty (e.g., T=Ø). If any of the conditions are satisfied, then the path generation process is terminated.

Otherwise, at block 658, computerized system 10 then updates the cost of the path from the recently added node to set P to all nodes remaining in set T, e.g., where $u_j = \min\{u_j, u_k + a_{kj}\}$ for all j ∈ T. This updating process is typically referred to as the relaxation process. Thereafter, computerized system 10 repeats block 652 to 658 with the recently added node to set P.

Since the above path generation process of FIG. 18 determines the shortest path between an originating node and a destination node, computerized system 10 performs the process for each affected demand to generate additional restoration paths, if any, for the demands.

Although the process of column generation typically converges to an optimal solution, it may take a significant amount of time to reach the optimal solution. The convergence speed is important to the performance of column generation. If only one path per demand is maintained per iteration, the convergence speed of the column generation process may be slow because some paths may be regenerated at a later iteration. On the other hand, if all the paths generated are retained, for a large problem (e.g., millions of paths may be generated), it may take a significantly long time to solve the LP problem for a single iteration. Thus, the total convergence speed could also be slow.

Accordingly, the invention preferably utilizes a dynamic path control policy to overcome the convergence problem. The dynamic path control policy regulates the number of restoration paths retained for use in each LP iteration. In particular, an upper bound S is set and represents the maximum number of restoration paths retained in the problem. A lower bound s is set and represents the minimum number of restoration paths retained in the problem. If the total number of restoration paths generated is less than or equal to the upper bound S, then all the restoration paths are retained. If the total number of restoration paths generated is greater than S, then some restoration paths are eliminated so that the total number of restoration paths is equal to s.

The criterion for deleting paths is the reduced cost associated with each path from the LP model. Generally, the reduced costs are ordered from smallest to largest. The top s paths (from the smallest reduced cost) are retained in the problem. In another preferred method, a certain number of paths may be kept for each demand, e.g., set $s_j$ and $s_j$ for each demand (j). The manner of setting the boundaries, S and s, is a separate optimization problem and will not be described in detail herein. However, some heuristics may be used to set the parameters.

Although the first and second embodiments have been described above for the basic restoration scenario, an optimal restoration capacity and/or optimal restoration paths may be computed for any path-based restoration scenario, such as those related to link or demand restoration in a network. Additional restoration scenario examples are provided below to illustrate the flexibility and adaptability of the system and method of the invention to solve a variety of restoration problems. The examples include a Cheap RIN Capacity Scenario, Disaster Recovery Scenario, Link/Disjoint Restoration Paths Scenario and Linear Chain Scenario. Except where otherwise noted in the description of these examples, the optimal restoration (capacity and the optimal restoration paths may be solved in the same manner as described above for the basic restoration scenario, in accordance with the first or second embodiments of the invention.

Cheap RIN Capacity Scenario

The LP model for a restoration scenario, for example the basic restoration scenario of Example #1, may be modified to accommodate two types of embedded capacity, e.g., some T3Ps and T3Rs. However, a network may include T3Ps that have not been cabled. These uncabled T3Ps are considered cheap RIN capacity since the cost of cabling up a T3P is less than the cost of building a new T3 (e.g., a new augment). The capacity of a cheap RIN is bounded by the number of T3Ps that have not yet been cabled for the RIN.

For the LP model with cheap RIN capacity, all the notations for the primal LP Emodel in Example #1 remain valid, with the addition of some new notations, as described below in Example #3.

EXAMPLE #3

Additional LP Notations $c_{rw}$: cost of using a cheap RIN r∈R; and $M_{rw}$: maximurrl cheap capacity on RIN r∈R.

LP Decision Variables $y_r$: new restoration capacity of RIN r∈R;

$w_r$: cheap restoration capacity of RIN r∈R; and $x_{ist}$: number of T3s of type t∈$T_s$ routed on path i if span s∈S fails (including a dummy path for each T3).

LP Objective Function $$\min \sum_r c_{ry} y_r + \sum_r c_{rw} w_r + \sum_{\text{dummy\_paths}} c_d x_{dst},$$

LP Constraints (1) Restore the demand: the demand for T3 t∈T, must be rerouted.

$$\sum_i x_{ist} = d_{st} \quad \forall s \in S, t \in T_s$$

(2) Satisfy capacity: the capacity needed for RIN r∈R must be less than or equal to the sum of the new capacity, the cheap capacity, and embedded capacity.

$$\sum_t \sum_{i \in Q_{rst}} x_{ist} - y_r - w_r \leq z_{rs} \quad \forall r \in R, s \in S$$

(3) Non-Negative Variables: All variables must be non-negative and less than upper bounds where appropriate.

$$0 \leq w_r \leq M_{rw}$$

$$x_{ist} \geq 0, y_r \geq 0.$$

In the LP model of Example #3, the cost of a cheap RIN, $c_{rw}$, is preferably proportional to the cost of cabling up a T3P. The cost of an augment, $c_{ry}$, is preferably proportional to the cost of building a new T3 in the network. The ratio between $C_d$ and $c_{ry}$ is preferably set to 100.

The optimal solution to the LP model with cheap RIN capacity provides the minimal cost combination of cheap RINs ($w_r$) and new RINs ($y_r$) that are required to restore as much demand as possible.

Although the above LP model with cheap RIN capacity is described in the primal form, the LP model may also be expressed,in other known LP forms, such as in the dual form. An example of the dual form of the LP model with cheap RIN capacity is provided below in Example #4 with an additional dual variable, $q_r$, which corresponds to the upper bound constraint on the number of cheap augments of RIN r.

EXAMPLE #4

LP Dual variables $u_{st}$: corresponds to the demand constraints;

$v_{rs}$: corresponds to the capacity constraints;

$q_r$: upper bound constraint on the number of cheap augments of RIN r.

LP Objective Function:

$$\text{Min} - \sum_s \sum_{t \in T_s} d_{st} u_{st} + \sum_r \sum_s z_{rs} v_{rs} + \sum_r M_{rw} q_r.$$

LP Constraints

For regular paths:

$$-u_{st} + \sum_{r \in RP_{ist}} v_{rs} \geq 0 \quad \forall i \in P_{st}, t \in T_s, s \in S.$$

For dummy paths:

$$u_{st} \leq c_d.$$

For new RIN r augments:

$$\sum_s v_{rs} \leq c_{ry}.$$

For cheap RIN r augments:

$$\sum_s v_{rs} - q_r \leq c_{rw};$$

and $v_{rs} \leq 0$, $u_{st}$ unrestricted, $q_r \leq 0$.

Disaster Recovery (DR) Scenario

The Disaster Recovery (DR) scenario relates to the situation in which all traffic originating or terminating at a failed switch must be rerouted to a reserve switch, referred to as a DR switch. To accomplish the foregoing, it is necessary to have sufficient restoration capacity from the failed switch to the DR switch. The problem is then to determine how much restoration capacity to add to the network in order to recover from any single switch failure. Since the DR scenarios are catastrophic events, the duration of the outage is long term. Thus, the protection capacity (T3P) should not be used for these scenarios. As such, some restrictions are added to the paths that are allowed for these demands. In addition, spare services capacity could be converted if required for these occurrences.

To solve the DR problem, a set of disaster recover spans are added, one for each possible failure switch. Each disaster recovery span carries one demand, from the switch site to the DR switch site, with the amount of capacity that would have to be rehomed or redirected from the failed switch to the DR switch. An example of an LP model formulated to solve the DR scenario is provided below in Example #5.

EXAMPLE #5

LP Notations $Q_{rst}$: set of paths in $P_{st}$ that ride on RIN r;
$c_{ry}$: ost of a new build for RIN r;
$c_{rw}$: cost of using a cheap T3P RIN r;
$c_{rv}$: cost of using a cheap T3R RIN r;
$c_{re}$: cost of using a spare service RIN r;
$c_d$: cost of using dummy restoration path;
$z_{rws}$: embedded T3P restoration capacity of RIN r if span s fails;
$z_{rvs}$: embedded T3R restoration capacity of RIN r if span s fails;
$M_{rw}$: maximum cheap T3P capacity on RIN r;
$M_{rv}$: maximum cheap T3R capacity on RIN r; and
$M_{re}$: maximum spare service capacity on RIN r.

LP Decision Variables $y_r$ = new restoration capacity of RIN r
$w_r$ = cheap T3P restoration capacity of RIN r
$v_r$ = cheap T3R restoration capacity of RIN r
$e_r$ = spare service capacity of RIN r
$x_{ist}$ = number of T3s of type t routed on path i if span s fails (including a dummy path for each)

LP Objective Function $$\min \sum_r c_{ry} y_r + \sum_r c_{rw} w_r + \sum_r c_{rv} v_r + \sum_r c_{re} e_r + \sum_{dummy\_paths} c_d x_{dst}$$

LP Constraints (1) Restore the demand:

$$\sum_i x_{ist} = d_{st} \quad \forall s \in S, t \in T_s$$

(2) Satisfy capacity:
(a) For regular span failure $$\sum_{t \in T_s} \sum_{i \in Q_{rst}} x_{ist} - y_r - w_r - v_r \leq z_{rws} + z_{rvs} \quad \forall r \in R, s \in \{regular\_spans\}$$

(b) For disaster recovery $$\sum_{t \in T_s} \sum_{i \in Q_{rst}} x_{ist} - y_r - v_r - e_r \leq z_{rvs} \quad \forall r \in R, s \in \{DR\_spans\}$$

$w_r \leq M_{rw}$ $v_r \leq M_{rv}$ $e_r \leq M_{re}$

As can be seen from Example #5, the LP model is preferably formulated to solve for different t)ypes of restoration capacity, such as cheap T3Ps ($w_r$), cheap T3Rs($v_r$) and spare service capacity($e_r$).

It should be understood that, for disaster recovery, the restoration paths for the traffic from each switch to the DR switch are obtained using a maximum flow algorithm. For each span failure, there is only a single source and destination pair, i.e., the failed switch and the DR switch. Thus, the restoration paths are determined by solving a single commodity maximum flow problem using the given restoration capacity (after solving the LP model) in the network, and integerization may be applied in straight-forward manner.

Linear Chains (LC) Scenario

In some networks, a sequence or chain of cheap RINs may share a common transmission facility with a longer express RIN. One express RIN may share a facility with a larger express RIN. The facility has a finite amount of capacity, but some flexibility exists in how the capacity is shared between the local and express RINs. For example, an OC48 may have forty-eight (48) T3s that can be split between one or more express RINs and several local RINs. An express RIN has fewer terminations and, thus, is cheaper than a series of local RINs. However, an express RIN can not serve local nodes. As such, the LC scenario requires a revision to the RIN capacity constraint, an example of which is provided below in Example #6.

EXAMPLE #6

Additional LP Notations

L: set of linear chains;
$R_e$: set of express RINs, $R_e \subset R$;
$R_{sub}$: set of sub-RINs on linear chains, $R_{sub} \subset R$;
$M_L$: capacity of the facility; and all the notations for the DR of Example #5.

LP Objective Function $$\min \sum_r c_{ry} y_r + \sum_r c_{rw} w_r + \sum_r c_{rv} v_r + \sum_r c_{re} e_r + \sum_{\text{dummy\_paths}} c_d x_{dst}$$

LP Constraints (1) Restore the demand:

$$\sum_i x_{ist} = d_{st} \quad \forall s \in S, t \in T_s$$

(2) Satisfy capacity:
(a) For regular span failure $$\sum_{t \in T_s} \sum_{i \in Q_{rst}} x_{ist} - y_r - w_r - v_r \leq z_{rws} + z_{rvs} \quad \forall r \in R, s \in \{\text{regular\_spans}\}$$

(b) For disaster recovery $$\sum_{t \in T_s} \sum_{i \in Q_{rst}} x_{ist} - y_r - v_r - e_r \leq z_{rvs} \quad \forall r \in R, s \in \{\text{DR\_spans}\}$$

(c) For each linear chain $$w_{r_e} + w_{r_s} \leq M, \forall r_e \in R_e, \forall r_s \in R_{sub}$$

$$w_r \leq M_{rw}$$

$$v_r \leq M_{rv}$$

$$e_r \leq M_{re}$$

Node/Link Disjoint Restoration Paths Scenario

The node/link disjoint restoration paths scenario (hereinafter "the disjoint scenario") relates to the situation in which the service path and the restoration path must remain separate from each other. That is, the restoration and the service may not share any common RIN/node.

The basic LP model, as shown in Example #1, assumes that traffic is rerouted around a failure based on the knowledge of which span has actually failed. Depending on the type of technology in the network, a node at one of the endpoints of a traffic demand may have to reroute the demand without knowing exactly which span has failed. In the disjoint scenario, the links in the restoration path must be completely disjoint from all of the links in the service path. Furthermore, it is necessary to determine only one set of restoration paths for each demand, but these restoration paths must be feasible for all possible span failures.

Accordingly, the LP model for the disjoint scenario has a smaller number of path variables, but the demand constraints are no longer separable by span failure. An example of the LP model for the node/link disjoint restoration path scenario is provided below in Example #7, with the dual-problem described below in Example 8. It should be noted that the variables are similar to variables in the basic model described in Example #1, but are no longer indexed by the spans.

EXAMPLE #7

LP Notations

S: set of spans which when failed cause a DMOQ violation and affect a unique set of RINs and T3s;

R: RINs with FASTAR capable end-points that have embedded restoration capacity or are augmentable;

T: T3s that need restoration;

$T_s$: T3s that need restoration given that span s failed, $T_s \subset T$;

$d_t$: number of T3s of aggregated type t that need restoration;

$P_t$: set of restoration paths available for T3 t (includes a dummy path for unrestorable T3s);

$Q_{rt}$: set of paths in $P_t$ that ride on RIN r;

$c_{ry}$: cost of a new build for RIN r;

$c_{rw}$: cost of using a cheap T3P RIN r;

$c_{rv}$: cost of using a cheap T3R RIN r;

$c_{re}$: cost of using a spare service RIN r;

$c_d$: cost of using dummy restoration path;

$z_{rws}$: embedded T3P restoration capacity of RIN r if span s fails;

$z_{rvs}$: embedded T3R restoration capacity of RIN r if span s fails;

$M_{rw}$: maximum cheap T3P capacity on RIN r;

$M_{rv}$: maximum cheap T3R capacity on RIN r;

$M_{re}$: maximum spare service capacity on RIN r; and $M_L$: capacity of the facility.

LP Decision Variables $y_r$=new restoration capacity of RIN r;

$w_r$=cheap T3P restoration capacity of RIN r;

$v_r$=cheap T3R restoration capacity of RIN r;

$e_r$=spare service capacity of RIN r; and $x_{it}$=number of T3s of type t routed on path i (including a dummy path for each).

LP Objective Function $$\min \sum_r c_{ry} y_r + \sum_r c_{rw} w_r + \sum_r c_{rv} v_r + \sum_r c_{re} e_r + \sum_{\text{dummy\_paths}} c_d x_{dt}.$$

LP Constraints (1) Restore the demand:

$$\sum_i x_{it} = d_t \quad t \in T$$

(2) Satisfy capacity:
(a) For a regular span failure $$\sum_{t \in T_s} \sum_{i \in Q_{rt}} x_{it} - y_r - w_r - v_r \leq z_{rws} + z_{rvs} \quad \forall r \in R, s \in \{\text{regular\_spans}\}.$$

(b) For disaster recovery $$\sum_{t \in T_s} \sum_{i \in Q_{rt}} x_{it} - y_r - v_r - e_r \leq z_{rvs} \quad \forall r \in R, s \in \{\text{DR\_spans}\}.$$

(c) For each linear chain $$w_{r_e} + w_{r_s} \leq M_L, \varsigma r_e \in R_e, \varsigma r_s \in R_{sub};$$

$$w_r \leq M_{rw};$$

$$v_r \leq M_{rv};$$

and $$e_r \leq M_{re}.$$

For the disjoint scenario, each demand must have a single set of restoration paths that are used for all span failures. Restoration paths can not be constructed for one span failure without considering all other span failures. As such, the path integerization process described above with reference to FIG. 13 may not be utilized to change the values of the path restoration variables to integer form. Instead, the capacity integerization process described above with reference to FIG. 12 is applied to the non-integer values of the restoration path variables, where the LP solution values for the restoration path variables are substituted for the capacity variables.

EXAMPLE #8

LP Notations: (All the notations defined in the primal are still valid)

$RP_{it}$: the set of RINs along path i of T3 t; and
$S_t$: the set of spans that affect T3 t.

LP Dual Variables:
  $u_t$: corresponds to the demand constraints;
  $v_{rs}$: corresponds to the capacity constraints;
  $l_r$: corresponds to the linear chain constraints; and
  $q_r$: corresponds to the upper bound constraints.

LP Objective Function $$\min - \sum_{t \in T} d_t u_t + \sum_r \sum_s z_{rs} v_{rs} + \sum_r \text{Max}(M_{rw_e}, M_{rw_s}) l_r + \sum_r M_r q_r$$

LP Constraints (a) For regular paths $$-u_t + \sum_{s \in S_t} \sum_{r \in RP_{it}} v_{rs} \geq 0 \quad \forall i \in P_t, t \in T$$

(b) For dummy paths $$u_t \leq c_d$$

(c) For new RIN r $$\sum_s v_{rs} \leq c_{ry}$$

(d) For T3P RIN r $$\sum_s v_{rs} - l_r - q_r \leq c_{rw}$$

(e) For T3R RIN r $$\sum_s v_{rs} - q_r \leq c_{rv}$$

(f) For spare service RIN r $$\sum_s v_{rs} - q_r \leq c_{re}$$

$v_{rs} \geq 0$, $u_t$ unrestricted, $l_r \leq 0$, $q_r \leq 0$

Column generation techniques may be utilized to provide a more efficient approach to solving LP Models. A primal objective function can be rewritten in the dual form, as follow:

$$\text{Max}\{c_j - c_B^T B^{-1} \bar{a}_j\} \Leftrightarrow$$

$$\text{Max}\left\{u_t - \sum_{s \in S_t} \sum_{r \in RP_{st}} v_{rs}\right\} \Leftrightarrow \text{Min}\left\{\sum_{s \in S_t} \sum_{r \in RP_{st}} v_{rs} - u_t\right\}.$$

For a T3 t, the best restoration path is the one that minimizes $$\sum_{s \in S_t} \sum_{r \in RP_{st}} v_{rs},$$

i.e., the shortest path from origin to destination where the length of each RIN is given by the dual variable $$\sum_{s \in S_t} v_{rs}.$$

In the column generation process, the sum of the dual variables $$\sum_{s \in S_t} v_{rs}$$

is utilized as cost for each RIN r to find a shortest path for each T3. If the total length of a shortest path of a T3 is less than the dual variable $u_t$ of the T3, the path is referred to as a feasible path and is added to the set of paths or the T3. A new LP is solved and the process is repeated with the new LP solution until no feasible path can be found for any T3.

The many features and advantages of the present invention are apparent from the detailed specification, and thus, it is intended by the appended claims to cover all such features and advantages of the invention which fall within the true scope of the present invention. For example, although the invention has been discussed above for an AT&T network with T3 demands, the invention can also be utilized to resolve restoration scenarios for other types of networks and for different demands, such as OC48, OC12, OC3, etc., as well as to solve line, link-related, and node restoration problems.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed:

1. A method of computing at least one of an optimal restoration capacity, and optimal restoration paths for a network including network paths to resolve a restoration scenario by solving a linear program model using network data corresponding to the network, wherein the linear program model includes decision variables corresponding to restoration capacity and restoration paths and constraints requiring restoration of network paths and conservation of capacity in the network, and wherein the network data includes information corresponding to costs related to network paths and a set of capacity in the network, the method comprising:

generating the shortest restoration path for each network path using capacity from the set of capacity according to the costs;

generating additional shortest restoration path with a minimum number of augments for any remaining demand for which no shortest restoration path was generated in the generating the shortest restoration path and adding the augments to the set of embedded capacity;

solving the linear program model with the generated shortest restoration paths and the set of capacity;

revising the costs with the solution of the linear program model and generating any additional shortest restoration paths for each affected network path with the revised costs and the set of capacity; and repeating the generating the shortest restoration path, the generating additional shortest restoration path, the solving, and the revising until the optimal restoration capacity and the optimal restoration paths are obtained.

2. The method according to claim 1, further comprising determining a set of network paths to be restored in the network prior to the solving the linear program model.

3. The method according to claim 1, further comprising preprocessing the network data to reduce an amount of the network data necessary to solve the linear program model, prior to the solving the linear program model.

4. The method according to claim 3, wherein the network data includes information corresponding to RINs, spans and demands.

5. The method according to claim 4, wherein the preprocessing the network data comprises aggregating the network data corresponding to the RINs comprising the same set of spans.

6. The method according to claim 4, wherein the preprocessing the network data further comprises aggregating the network data corresponding to the demands having the same RINs.

7. The method according to claim 4, wherein the preprocessing the network data further comprises aggregating the network data corresponding to the spans having the same RINs.

8. The method according to claim 1, further comprising changing one of the optimal restoration capacity and the optimal restoration paths obtained by the solving the linear program model into integer form.

9. The method according to claim 8, further comprising changing the integer form of one of the optimal restoration capacity and the optimal restoration paths to an original format of the network data.

10. The method according to claim 1, further comprising controlling an amount of the generated shortest restoration paths retained to solve the linear program model.

11. The method according to claim 10, wherein the controlling limits the amount of the generated shortest restoration paths to a predetermined range.

12. The method according to claim 1, wherein the network paths are selected from the group consisting of demands and links.

13. The method according to claim 1, wherein the restoration capacity is selected from the group consisting of embedded capacity, uncabled protection capacity, augments and spare services.

14. The method according to claim 1, wherein the restoration scenario comprises a basic restoration scenario.

15. The method according to claim 1, wherein the restoration scenario comprises a cheap RIN capacity.

16. The method according to claim 1, wherein the restoration scenario comprises a disaster recovery scenario.

17. The method according to claim 1, wherein the restoration scenario comprises a Link/Disjoint restoration paths scenario.

18. The method according to claim 1, wherein the restoration scenario comprises a linear chain scenario.

19. A method of establishing an alternate traffic route in a network formed from a plurality of nodes interconnected by a plurality of transmission links through the use of capacity including the optimal restoration capacity computed according to the method of claim 15.

20. A system for computing at least one of an optimal restoration capacity and optimal restoration paths for a network including network paths to resolve a restoration scenario, the system comprising:

data storage device for storing network data corresponding to the network; and processor, coupled to the data storage device, for solving a linear program model to determine at least one of the optimal restoration capacity and the optimal restoration paths, the linear program model including decision variables corresponding to restoration capacity and restoration paths and constraints requiring restoration of network paths and conservation of capacity in the network, wherein the network data includes information corresponding to costs related to network paths and a set of capacity in the network, the processor:

(e) generating the shortest restoration path for each network path using capacity from the set of capacity according to the costs;

(f) generating additional shortest restoration path with a minimum number of augments for any remaining demand for which no shortest restoration path was generated in (e) and adding the augments to the set of capacity;

(g) solving the linear program model with the generated shortest restoration paths and the set of capacity;

(h) revising the costs with the solution of the linear program in (g) and generating any additional shortest restoration paths for each affected network path with the revised costs and the set of capacity; and (i) repeating (g) and (h) until the optimal restoration capacity and the optimal restoration paths are obtained.

21. The system according to claim 20, wherein the processor is adapted to determine a set of network paths to be restored in the network prior to solving the linear program model.

22. The system according to claim 20, wherein the processor preprocesses the network data to reduce an amount of the network data necessary to solve the linear program model.

23. The system according to claim 22, wherein the network paths are demands and the network data includes information corresponding to RINs, spans and demands.

24. The system according to claim 23, wherein the processor preprocesses the network data by aggregating the network data corresponding to the RINs comprising the same set of spans.

25. The system according to claim 23, wherein the processor preprocesses the network data by aggregating the network data corresponding to the spans having the same RINs.

26. The system according to claim 20, wherein the processor changes one of the optimal restoration capacity and the optimal restoration paths obtained by solving the linear program model into integer form.

27. The system according to claim 20, wherein the processor changes one of the optimal restoration capacity and the optimal restoration paths obtained by solving the linear program model to an original format of the network data.

28. The system according to claim 20, wherein the processor controls an amount of the generated shortest restoration paths retained to solve the linear program model.

29. The system according to claim 28, wherein the processor controls the amount of the generated shortest restoration paths by limiting the amount of the generated shortest restoration paths to a predetermined range.

30. The system according to claim 20, wherein the network paths are selected from the group consisting of demands and links.

31. The system according to claim 20, wherein the restoration capacity is selected from the group consisting of embedded capacity, uncabled protection capacity augments and spare services.

32. The system according to claim 20, wherein the restoration scenario is selected from the group consisting of a basic restoration scenario, cheap RIN capacity scenario, disaster recovery scenario, Link/Disjoint restoration paths scenario and linear chain scenario.

33. A service restoration system for use in a communications network formed from a plurality of nodes interconnected by a plurality of transmission links, the system comprising:

means for monitoring each node and link forming the network to detect a disruption in traffic flow; and control means, responsive to the detection of a disruption in traffic flow, for establishing an alternate traffic route around the disruption through the use of capacity including the optimal restoration capacity computed by the system according to claim 20.

* * * * *

UNITED STATES PATENT AND TRADEMARK OFFICE
CERTIFICATE OF CORRECTION

| | | |
|---|---|---|
| PATENT NO. | : 6,498,778 B1 | |
| DATED | : December 24, 2002 | |
| INVENTOR(S) | : Sabastian Cwilich et al. | |

It is certified that error appears in the above-identified patent and that said Letters Patent is hereby corrected as shown below:

<u>Title page,</u>
Item [56], References Cited, U.S. PATENT DOCUMENTS, please delete "5,059,105 A * 10/1991 Mansour et al. ......... 370/16".

<u>Column 30,</u>
Line 7, please change "claim 15" to -- claim 1 --.

Signed and Sealed this

Third Day of June, 2003

JAMES E. ROGAN
*Director of the United States Patent and Trademark Office*